United States Patent
Ma et al.

(10) Patent No.: US 6,912,183 B2
(45) Date of Patent: Jun. 28, 2005

(54) HIGH-SPEED OPTICAL READ/WRITE PICK-UP MECHANISMS AND ASSOCIATED METHODS

(75) Inventors: Kelvin Ma, Clifton Park, NY (US); Glenn Forman, Niskayuna, NY (US); Jeannine Jones, Enfield, CT (US)

(73) Assignee: General Electric Company, Niskayuna, NY (US)

( * ) Notice: Subject to any disclaimer, the term of this patent is extended or adjusted under 35 U.S.C. 154(b) by 325 days.

(21) Appl. No.: 10/368,170

(22) Filed: Feb. 18, 2003

(65) Prior Publication Data

US 2004/0160886 A1 Aug. 19, 2004

(51) Int. Cl.[7] .................................................. G11B 7/00

(52) U.S. Cl. ................................ 369/44.19; 369/44.14; 369/44.17

(58) Field of Search ........................... 369/44.11, 44.14, 369/44.17, 44.19, 44.27, 47.1, 53.1

(56) References Cited

U.S. PATENT DOCUMENTS

| | | | |
|---|---|---|---|
| 4,004,081 A | 1/1977 | Zorn | |
| 5,541,908 A | 7/1996 | Hsu et al. | |
| 5,828,482 A | 10/1998 | Jain | |
| 6,625,110 B2 * | 9/2003 | Kim et al. | ................. 369/300 |
| 6,781,929 B2 * | 8/2004 | Kadlec | .................... 369/44.28 |
| 6,826,138 B2 * | 11/2004 | Abrahamson et al. | ... 369/53.25 |

* cited by examiner

Primary Examiner—Muhammad Edun

(57) ABSTRACT

High-speed pick-up mechanisms operable for reading data from and/or writing data to an optical storage medium are disclosed. These mechanisms comprise a pivotable structure, a reflective element, a light source, a light receiving device, and an actuation device. The light source and the light receiving device are remotely located from the reflective element via the pivotable structure, and only the reflective element and a portion of the pivotable structure are positioned adjacent the surface of an optical storage medium. High-speed optical read/write devices and systems comprising these high-speed pick-up mechanisms are also disclosed. Additionally, high-speed methods for reading data from and/or writing data to an optical storage medium are disclosed.

57 Claims, 22 Drawing Sheets

HIGH-SPEED OPTICAL READ/WRITE PICK-UP MECHANISMS AND ASSOCIATED METHODS

FIELD OF THE INVENTION

The present invention relates generally to the field of optical read/write and optical storage media technology. More specifically, the present invention relates to high-speed, high-capacity optical read/write pick-up mechanisms that incorporate a light source and a light receiving device remotely located from a reflective element via a pivotable structure. Only the reflective element and a portion of the pivotable structure are positioned adjacent to the surface of an optical storage medium.

BACKGROUND OF THE INVENTION

Conventional optical read/write pick-up mechanisms, such as those used in compact disc ("CD") players/recorders, digital versatile disc ("DVD") players/recorders, and the like, incorporate a relatively heavy, bulky optical read/write head attached to a tracking mechanism. Typically, both the optical read/write head and the tracking mechanism are positioned adjacent to the surface of a spinning optical storage medium, such as a CD, a DVD, or the like, during operation. This configuration is illustrated in FIG. 1. Referring to FIG. 1, the optical read/write head 10 includes a light source 12, such as a laser diode or the like, operable for transmitting encoded/un-encoded light, such as laser light or the like, to the surface 14 of the optical storage medium 16. The optical read/write head 10 also includes a light receiving device 18, such as a photodiode or the like, operable for receiving encoded/un-encoded light, such as laser light or the like, from the surface 14 of the optical storage medium 16. A reflective element 20, such as a semi-reflective mirror, a beam splitter, or the like, and a focusing lens 22 or other focusing optics may also be used to transmit the light to and/or receive the light from the surface 14 of the optical storage medium 16.

Using the optical read/write head 10, data may be retrieved from and/or stored on predetermined portions of the surface 14 of the optical storage medium 16 via the selective positioning of the tracking mechanism 24 and the optical read/write head 10. Typically, the tracking mechanism 24 includes a pick-up carrier assembly 26 movably attached to one or more guide rails 28, a portion of which may be threaded. In conjunction with a servo motor 30 or the like, the one or more guide rails 28 are operable for moving the tracking mechanism 24 and the optical read/write head 10 linearly with respect to the surface 14 of the optical storage medium 16. Alternatively, a typical CD player/recorder may use the tracks of a CD for position control, rather than an encoder embedded in the rail, to reduce cost.

As described above, conventional optical read/write heads are relatively heavy and bulky (due to the need for a laser diode, a photodiode, focusing optics, etc.). Conventional optical read/write heads are also positioned adjacent to the surface of the optical storage medium along with a tracking mechanism. Conventional optical read/write heads are further limited to linear movement with respect to the surface of the optical storage medium. As a result, the current generation of optical read/write pick-up mechanisms has a relatively slow access time, especially when compared to that of conventional magnetic storage devices. For example, the average random access time of a CD player/recorder, a DVD player/recorder, or the like is about 100 ms. A magnetic hard drive, however, has an average random access time of about 5–10 ms. This difference in average random access time is attributable to the fact that a magnetic read/write head is relatively light and small, and may be attached to a relatively fast-moving voice coiled motor or other servo mechanism that may be moved back and forth across a magnetic platter at speeds of up to about 60 times per second. The relatively heavy, bulky optical read/write head, mounted on a linear track and controlled by a servo motor or the like, may only be moved back and forth across the optical disc at speeds of about 5–10 times per second. As a result, for many applications, a magnetic storage device is preferred. For example, many computerized game systems and the like use a magnetic storage device to run graphics-intensive applications and to store data, and an optical storage device to run other applications, such as game programs. This is due to the high speed and capacity requirements associated with such graphics and storage applications. Such computerized game systems require relatively frequent read/write accesses to the storage medium, thus necessitating relatively high speed.

Recent efforts related to CD player/recorders, DVD players/recorders, and the like have focused on improving the data transfer rate by increasing the rotational speed of the spinning optical storage medium. These efforts, although marginally effective in increasing the maximum data transfer rate, do little to improve the average random access time of the drives or their capacity. Attempts to increase the capacity of optical storage media and optical storage devices have focused on combining optical and magnetic technologies to increase the density of the available storage area. For example, "near-field recording" requires the optical read/write head to be positioned very close to the surface of the optical storage medium. Such high-density digital disc ("HDD")-related attempts have failed due to the short working distances between the read/write head and the storage medium, contamination on the surface of the medium substantially affecting the read/write pick-up mechanism.

Thus, what is still needed is a high-speed, high-capacity optical read/write pick-up mechanism that may, in various respects, be used effectively with at least the prior two generations of optical storage media. The present invention seeks to divorce the relatively heavy, bulky portion of the optical read/write head described above from the actuation/tracking mechanism and, using free space optics and/or guided optics, replace it with a microstructure mirror, a moveable micro-electromechanical systems ("MEMS") mirror, or the like. As a result, the weight and size of the optical read/write pick-up mechanism may be drastically reduced, especially over the surface of the optical storage medium, and the performance of the optical storage device is allowed to approach that of a magnetic storage device.

Additionally, the configuration of the optical read/write pick-up mechanism of the present invention makes it practical to read from and/or write to both surfaces of an optical storage medium, thereby increasing capacity. Finally, the use of a voice coil motor or the like, such as that used in magnetic storage devices, for the actuation and control of the reflective element makes the optical read/write pick-up mechanism of the present invention economically efficient and commercially viable.

BRIEF SUMMARY OF THE INVENTION

As described above, an optical storage medium, such as a compact disc ("CD"), a digital versatile disc ("DVD"), or the like, contains tracks of data that are read from and/or written to by an optical read/write pick-up mechanism. The actuation/tracking mechanism associated with the optical read/write pick-up mechanism must have relatively low weight and small size in order to seek selected tracks of data with low latency and high access times. Advantageously, the optical read/write pick-up mechanism of the present invention replaces the relatively heavy, bulky optical read/write head (including the light source, the light receiving device, the reflective element, the focusing lens, etc.), comprising a portion of a conventional optical read/write pick-up mechanism and attached to the actuation/tracking mechanism, with a relatively simple reflective element. This reflective element may include a microstructure mirror, a movable microelectromechanical systems ("MEMS") mirror, or the like. This allows the actuation/tracking mechanism to move with increased speed relative to the surface of the optical storage medium. The relatively heavy, bulky components of the optical read/write head are located remotely from the microstructure mirror, the MEMS mirror, or the like and interact with the microstructure mirror, the MEMS mirror, or the like via free space optics and/or guided optics. Advantageously, the configuration of the optical read/write pick-up mechanism of the present invention allows both surfaces of the optical storage medium to be read from and/or written to and a stronger, higher power light source may be used, if desired.

In one embodiment of the present invention, a high-speed pick-up mechanism operable for reading data from and/or writing data to an optical storage medium includes a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium. The pick-up mechanism also includes a reflective element associated with the second end of the pivotable structure, wherein the reflective element is operable for transmitting (deflecting and focusing) light to and/or receiving (deflecting and collimating) light from the surface of the optical storage medium. The pick-up mechanism further includes a light source associated with the first end of the pivotable structure, wherein the light source is operable for transmitting light to the reflective element along an optical path, and a light receiving device associated with the first end of the pivotable structure, wherein the light receiving device is operable for receiving light from the reflective element along the optical path. The pick-up mechanism still further includes an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

In another embodiment of the present invention, a high-speed optical pick-up mechanism operable for reading data from and/or writing data to an optical storage medium includes a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium. The optical pick-up mechanism also includes a first reflective element associated with the second end of the pivotable structure, wherein the first reflective element is operable for transmitting (deflecting and focusing) light to and/or receiving (deflecting and collimating) light from the surface of the optical storage medium, and a second reflective element associated with the first end of the pivotable structure, wherein the second reflective element is operable for transmitting light to and/or receiving light from the first reflective element along an optical path. The optical pick-up mechanism further includes a light source associated with the first end of the pivotable structure, wherein the light source is operable for transmitting light to the second reflective element along the optical path, and a light receiving device associated with the first end of the pivotable structure, wherein the light receiving device is operable for receiving light from the second reflective element along the optical path. The optical pick-up mechanism still further includes an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

In a further embodiment of the present invention, a high-speed optical read/write device includes a high-speed pick-up mechanism operable for reading data from and/or writing data to an optical storage medium, the pick-up mechanism including a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium. The pick-up mechanism also including a reflective element associated with the second end of the pivotable structure, wherein the reflective element is operable for transmitting (deflecting and focusing) light to and/or receiving (deflecting and collimating) light from the surface of the optical storage medium. The pick-up mechanism further including a light source associated with the first end of the pivotable structure, wherein the light source is operable for transmitting light to the reflective element along an optical path, and a light receiving device associated with the first end of the pivotable structure, wherein the light receiving device is operable for receiving light from the reflective element along the optical path. The pick-up mechanism still further including an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

In a still further embodiment of the present invention, a high-speed optical read/write system includes a high-speed optical pick-up mechanism operable for reading data from and/or writing data to an optical storage medium, the optical pick-up mechanism including a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium. The optical pick-up mechanism also including a first reflective element associated with the second end of the pivotable structure, wherein the first reflective element is operable for transmitting (deflecting and focusing) light to and/or receiving (deflecting and collimating) light from the surface of the optical storage medium, and a second reflective element associated with the first end of the pivotable structure, wherein the second reflective element is operable for transmitting light to and/or receiving light from the first reflective element along an optical path. The optical pick-up mechanism further including a light source associated with the first end of the pivotable structure, wherein the light source is operable for transmitting light to the second reflective element along the optical path, and a light receiving device associated with the first end of the pivotable structure, wherein the light receiving device is operable for receiving light from the second reflective element along the optical path. The optical pick-up mechanism still further including an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

In a still further embodiment of the present invention, a high-speed method for reading data from and/or writing data to an optical storage medium includes providing a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium. The method also includes disposing a reflective element in proximity to the second end of the pivotable structure, wherein the reflective element is operable for transmitting light to and/or receiving light from the surface of the optical storage medium. The method further includes disposing a light source in proximity to the first end of the pivotable structure, wherein the light source is operable for transmitting light to the reflective element along an optical path, and disposing a light receiving device in proximity to the first end of the pivotable structure, wherein the light receiving device is operable for receiving light from the reflective element along the optical path. The method still further includes coupling an actuation device with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

Advantageously, the optical read/write pick-up mechanism of the present invention uses a remote laser source and photo-detection opto-electronics to provide relatively fast seek/access times with relatively low track-to-track latency and relatively high capacity. This is desirable for time-sensitive applications, such as graphics-intensive computer gaming applications, imaging applications, and storage applications, where data transfer rates and seek/access times are critical performance criteria.

DETAILED DESCRIPTION OF THE INVENTION

As described above, the optical read/write pick-up mechanism of the present invention replaces the relatively heavy, bulky optical read/write head, including the light source, the light receiving device, the reflective element, the focusing lens, etc., attached to the actuation/tracking mechanism of a conventional optical read/write pick-up mechanism with a relatively simple reflective element, such as a microstructure mirror, a moveable micro-electromechanical systems ("MEMS") mirror, or the like. This allows the actuation/tracking mechanism to move with increased speed with respect to the surface of an optical storage medium. The relatively heavy, bulky components of the optical read/write head are located remotely from the microstructure mirror, MEMS mirror, or the like and interact with the microstructure mirror, MEMS mirror, or the like via free space optics and/or guided optics. The configuration of the optical read/write pick-up mechanism of the present invention allows both surfaces of the optical storage medium to be read from and/or written to and a stronger, higher power light source may be used for faster writing speeds.

Figure 1:
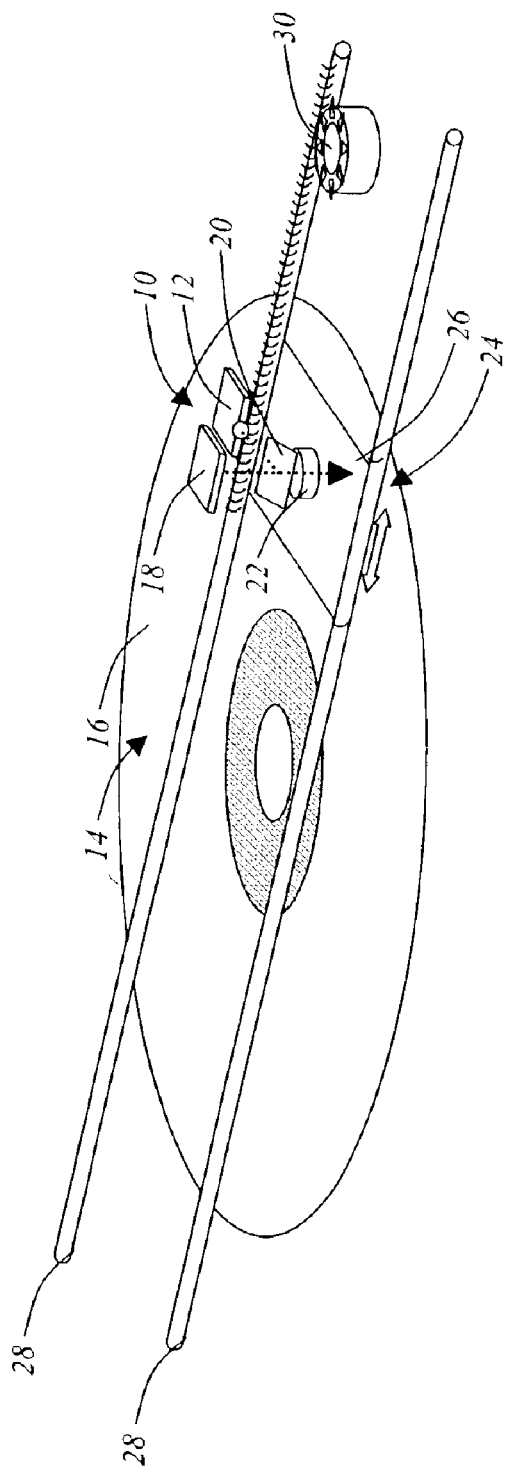
FIG. 1 is a perspective view of a conventional optical read/write pick-up mechanism, including a conventional optical read/write head positioned adjacent to the surface of a spinning optical storage medium.
Figure 2:
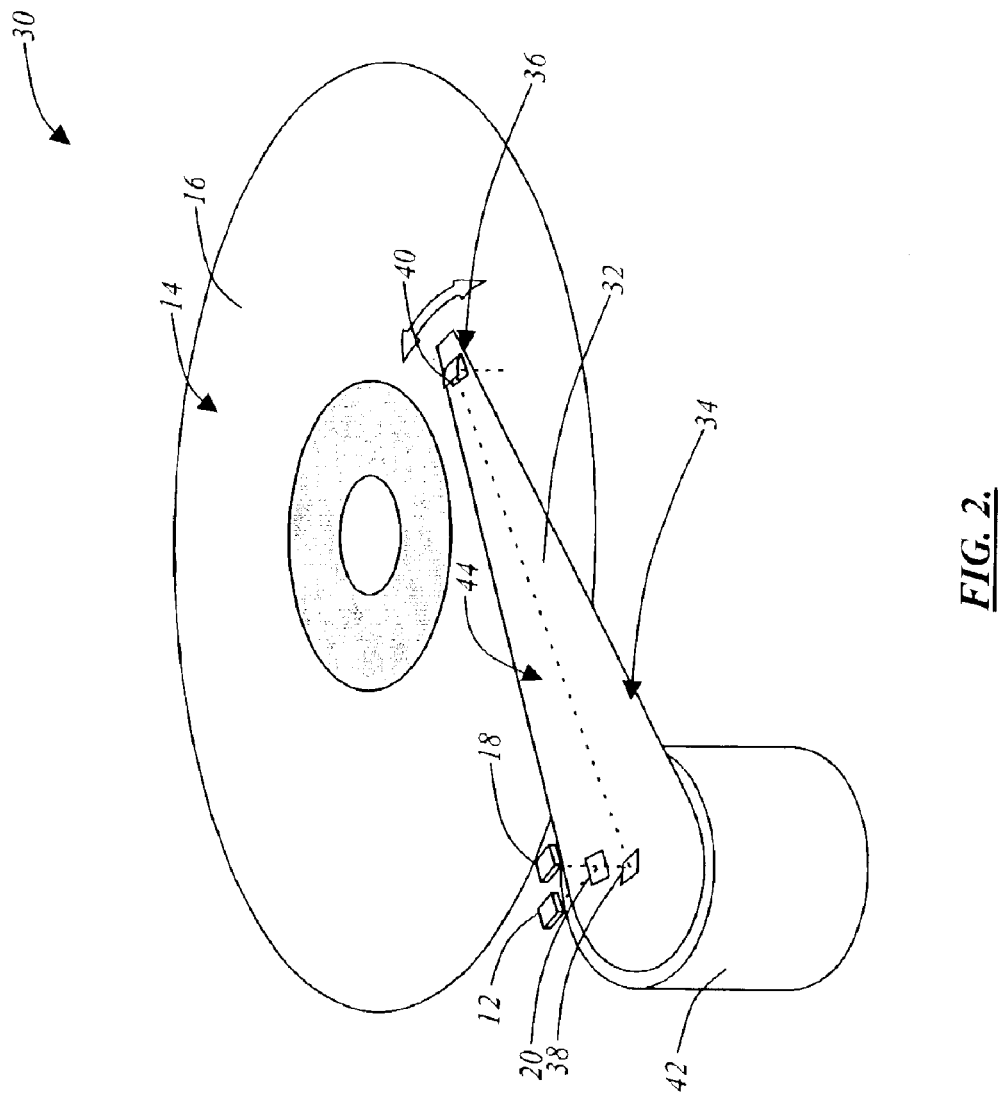
FIG. 2 is a perspective view of one embodiment of the high-speed optical read/write pick-up mechanism of the present invention.

Referring to FIG. 2, in one embodiment of the present invention, a high-speed optical read/write pick-up mechanism 30 operable for reading data from and/or writing data to the surface 14 of an optical storage medium 16, such as a compact disc ("CD"), a digital versatile disc ("DVD"), or the like, includes a pivotable structure 32, such as a pivotable arm or the like, having a first end 34 and a second end 36. A first reflective element 38, such as a reflective mirror or the like, is attached to or integrally formed with the first end 34 of the pivotable structure 32. A second reflective element 40 is attached to or integrally formed with the second end 36 of the pivotable structure 32. The second end 36 of the pivotable structure 32 is positioned adjacent to and in a spaced-apart relationship with the surface 14 of the optical storage medium 16. An actuation device 42, such as a voice coil motor, a servo mechanism, or the like, is coupled to the first end 34 of the pivotable structure 32 and, when actuated, causes the second end 36 of the pivotable structure 32 to move in an arc, parallel to the surface 14 of the optical storage medium 16 while the optical storage medium 16 is spinning. Thus, the second reflective element 40 may be positioned adjacent to any selected portion of the surface 14 of the optical storage medium 16.

A light source 12, such as a laser diode or the like, and a semi-reflective mirror 20 are positioned in proximity to the first end of the pivotable structure 32 and the first reflective element 38. Optionally, the light source 12 is attached to and supported by a fixed or movable mounting bracket (not shown). Further, the light source 12 and the semi-reflective mirror 20 may be attached to the first end 34 of the pivotable structure 32 and move in coordination with the pivotable structure 32.

The light source 12 is operable for generating and transmitting light, such as laser light or the like, to the semi-reflective mirror 20. The light is then transmitted to the first reflective element 38, the second reflective element 40, and the surface 14 of the optical storage medium 16. The light generated by the light source 12 may be encoded with data or un-encoded. Light from the surface 14 of the optical storage medium 16 is transmitted to the second reflective element 40 and the first reflective element 38, and is received by a light receiving device 18, such as a photodiode or the like. Again, the light received by the light receiving device 18 may be encoded with data or un-encoded.

Thus, using the light, the optical path 44 formed between the first reflective element 38 and the second reflective element 40, and free space optics, data may be read from and/or written to the surface 14 of the optical storage medium 16. As will be described in greater detail herein below and as is well known to those of ordinary skill in the art, the form and content of this data, its encoding/decoding, and the positioning of the pivotable structure 32 may be controlled by one or more processors/controllers (not shown).

Advantageously, the optical read/write pick-up mechanism 30 of FIG. 2 has relatively fewer components positioned adjacent to the surface 14 of the optical storage medium 16 than conventional optical read/write pick-up mechanisms. Many of these components, such as the voice coil motor, servo mechanism, or the like, are widely used in convention magnetic storage devices. Thus, the optical read/write pick-up mechanism 30 of the present invention is economically efficient and commercially viable. The majority of the components are external to the movable portion(s) of the optical read/write pick-up mechanism 30. Thus, a relatively higher-powered laser (and therefore a relatively heavier, bulkier light source) may be used, allowing for faster optical read/write speeds while minimizing the mass of the pivotable structure, enabling fast average random access speeds of only a few milliseconds.

As described above, the optical read/write pick-up mechanism of the present invention is designed to provide a relatively light, compact optical read/write head allowing for decreased average random access times. This enhanced access and tracking performance allows the material density of an optical storage medium to be optimized to its theoretical limits. Thus, the optical read/write pick-up mechanism of the present invention performs favorably when compared to conventional magnetic storage devices. In effect, the optical read/write pick-up mechanism of the present invention replaces the magnetic head of a high-density digital disc ("HDD")-based system with a reflective element, such as a microstructure mirror, a MEMS mirror, or the like, and transmits an optical signal over free space or, optionally, by fiber or waveguide. Both fixed and moveable reflective elements may be used to track rapidly while moving the optical read/write head through an arc across the surface of a spinning optical storage medium. Because the pivotable structure pivots at one point, the reflective element may be used to make angular corrections and focus a light beam out of the guided or unguided light source and into the light receiving device, both of which may be disposed at a convenient fixed or moveable location. As is described in greater detail herein below, the reflective element may take a plurality of fixed or moveable forms.

Figure 3:
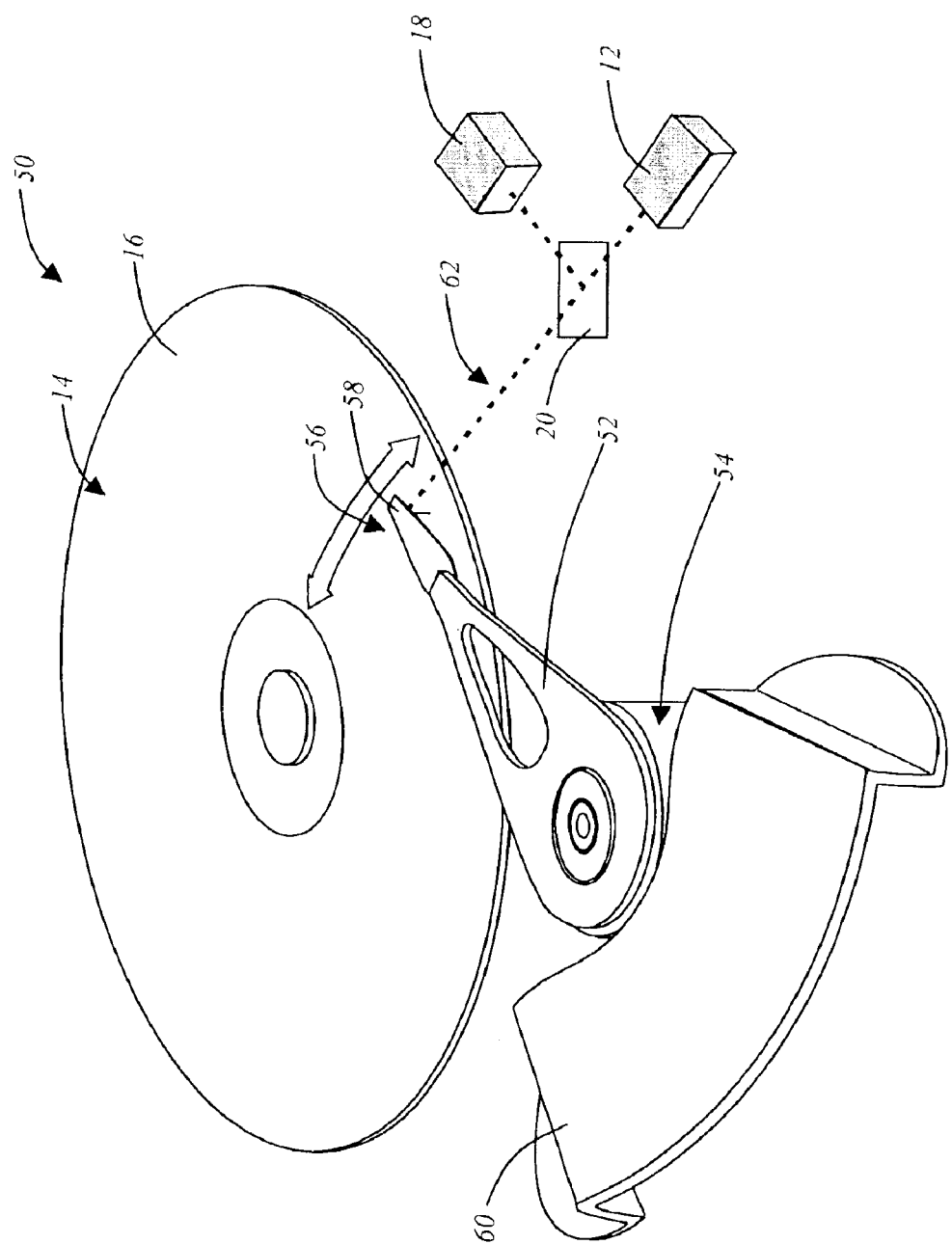
FIG. 3 is a perspective view of another embodiment of the high-speed optical read/write pick-up mechanism of the present invention.

Referring to FIG. 3, in another embodiment of the present invention, an optical read/write pick-up mechanism 50 operable for reading data from and/or writing data to the surface 14 of an optical storage medium 16, such as a CD, a DVD, or the like, includes a pivotable structure 52, such as a pivotable arm or the like, having a first end 54 and a second end 56. A reflective element 58 is attached to or integrally formed with the second end 56 of the pivotable structure 52. The second end 56 of the pivotable structure 52 is positioned adjacent to and in a spaced-apart relationship with the surface 14 of the optical storage medium 16. An actuation device 60, such as a voice coil motor, a servo mechanism, or the like, is coupled to the first end 54 of the pivotable structure 52 and, when actuated, causes the second end 56 of the pivotable structure 52 to move in an arc parallel to the surface 14 of the optical storage medium 16 while the optical storage medium 16 is spinning. Thus, the reflective element 58 may be positioned adjacent to any selected portion of the surface 14 of the optical storage medium 16.

A light source 12, such as a laser diode or the like, and a semi-reflective mirror 20 are positioned in opposing relation to the second end 56 of the pivotable structure 52 and the reflective element 58. Optionally, the light source 12 and the semi-reflective mirror 20 are attached to and supported by a fixed or moveable mounting bracket (not shown).

Figure 4:
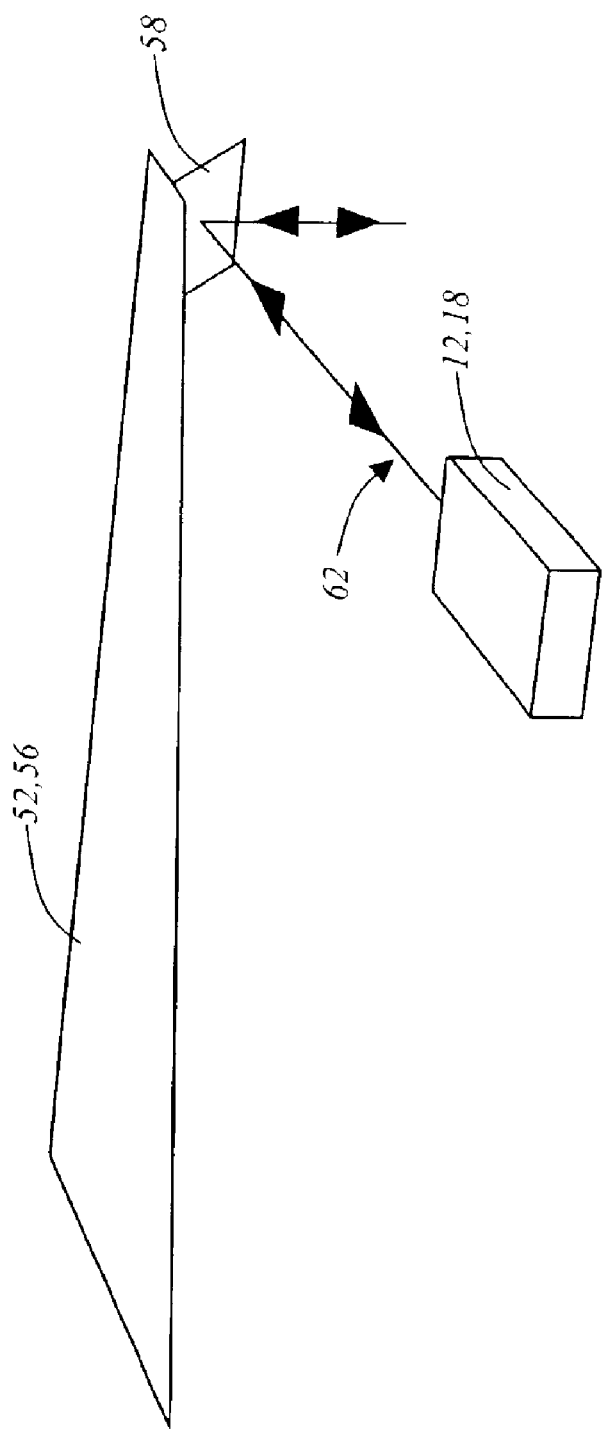
FIG. 4 is a schematic diagram illustrating the optical path formed and used by the optical read/write pick-up mechanism of the present invention.

The light source 12 is operable for generating and transmitting light, such as laser light or the like, through the semi-reflective mirror 20. The light is then transmitted to the reflective element 58 and the surface 14 of the optical storage medium 16. The light generated by the light source may be encoded or un-encoded. Light from the surface 14 of the optical storage medium 16 is transmitted to the reflective element 58 and the semi-reflective mirror 20, and is received by a light receiving device 18, such as a photodiode or the like. Again, the light received by the light receiving device 18 may be encoded or un-encoded. Thus, using the light; the optical path 62 formed between the light source 12, the light receiving device 18, and the surface 14 of the optical storage medium 16 through the reflective element 58; and free space optics techniques, data may be read from and/or written to the surface 14 of the optical storage medium 16. This optical path 62 is further illustrated in FIG. 4.

Figure 5:
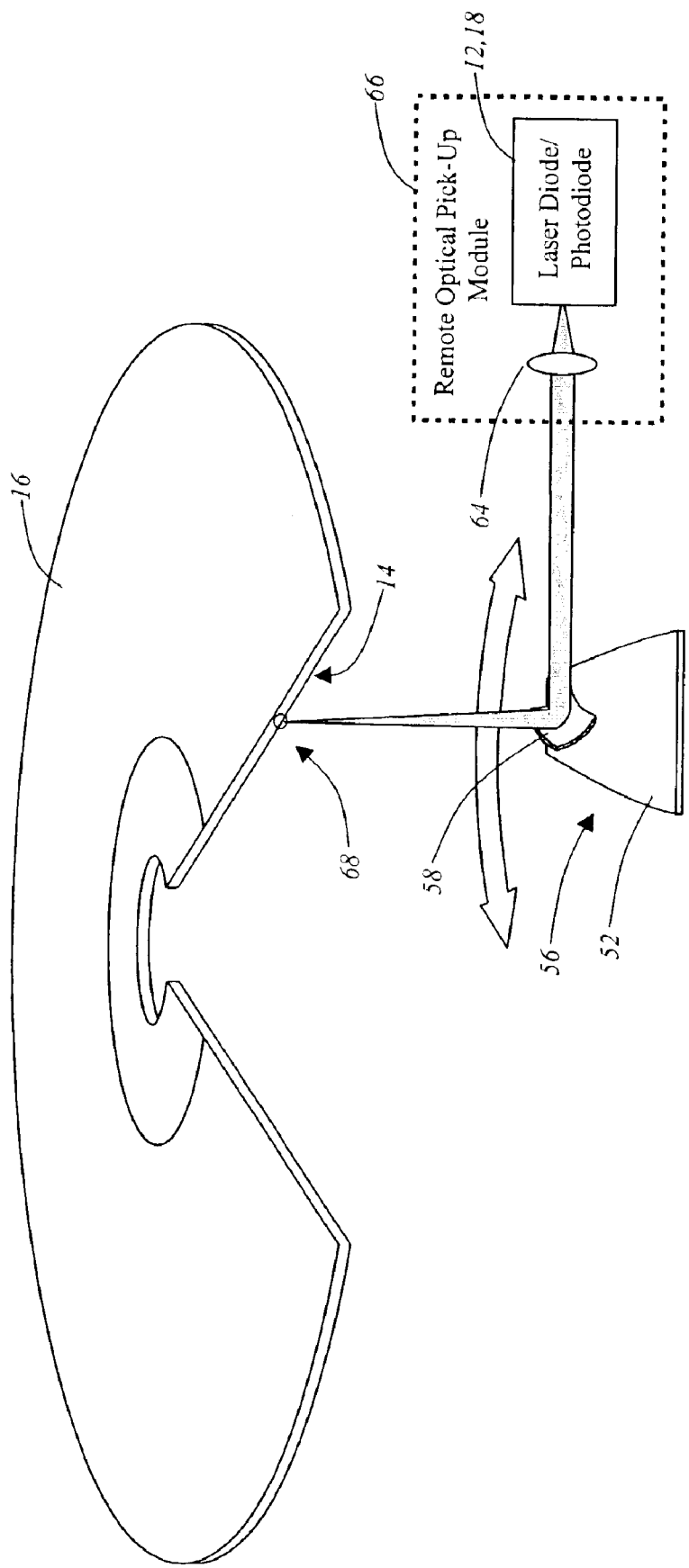
FIG. 5 is a perspective view/schematic diagram illustrating one embodiment of a reflective element that may be used in conjunction with the optical read/write pick-up mechanism of the present invention.

Referring to FIG. 5, in a further embodiment of the present invention, the reflective element 58 is attached to the second end 56 of the pivotable structure 52. The reflective element 58 may have any curvature in any direction along the reflective element 58, such as a side curvature or the like, suitable for focusing light and transmitting it to and/or from the surface 14 of the optical storage medium 16 and the light source 12 and/or the light receiving device 18. Likewise, the reflective element 58 may have any curvature in any direction along the reflective element 58, such as a top curvature or the like, suitable for compensating for the movement of the pivotable structure 52. As is shown in FIG. 5, the light source 12, the light receiving device 18, and one or more collimating optics devices 64 may make up a remote optics pick-up module 66. This remote optics pick-up module 66, in conjunction with the other components of the optical read/write pick-up mechanism 50 (FIG. 3), is operable for reading data 68 from and/or writing data 68 to the surface 14 of the optical storage medium 16.

Figure 6:
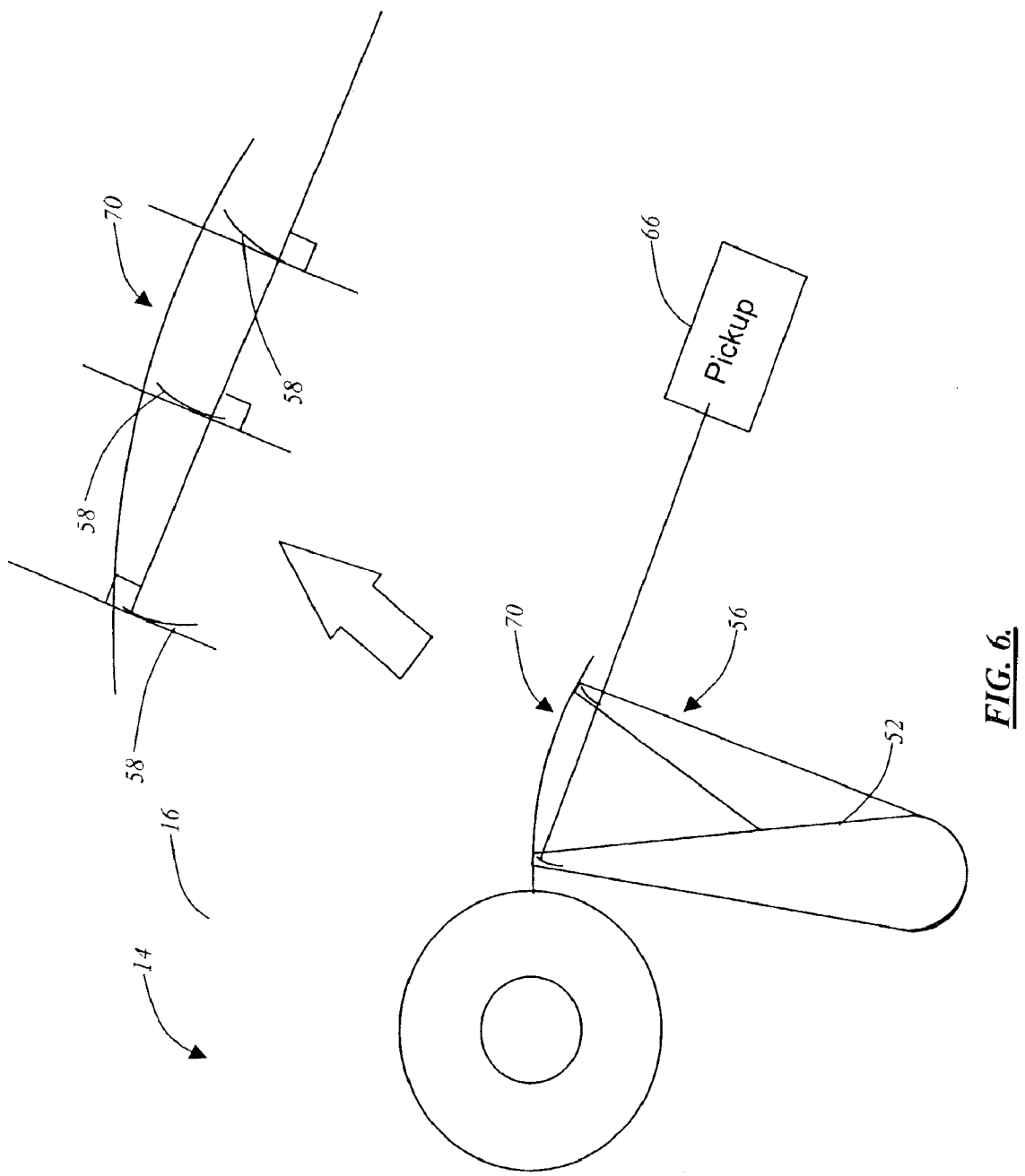
FIG. 6 is a schematic diagram illustrating a first plurality of possible configurations of the reflective element of the optical read/write pick-up mechanism of the present invention.

Referring to FIG. 6, in a still further embodiment of the present invention, the reflective element 58 attached to or integrally formed with the second end 56 of the pivotable structure 52 is preferably configured such that it maintains a constant 90-degree reflection angle with respect to the remote optical pick-up module 66 as it sweeps an arc 70 across the surface 14 of the optical storage medium 16. Optionally, the reflective element 58 may take the form of a quarter dome, a half dome, a substantially ellipsoidal/spherical structure, or the like. In the embodiment shown, the remote optical pick-up module 66 is remotely located from and/or is substantially perpendicular to the pivotable structure 52.

Figure 7:
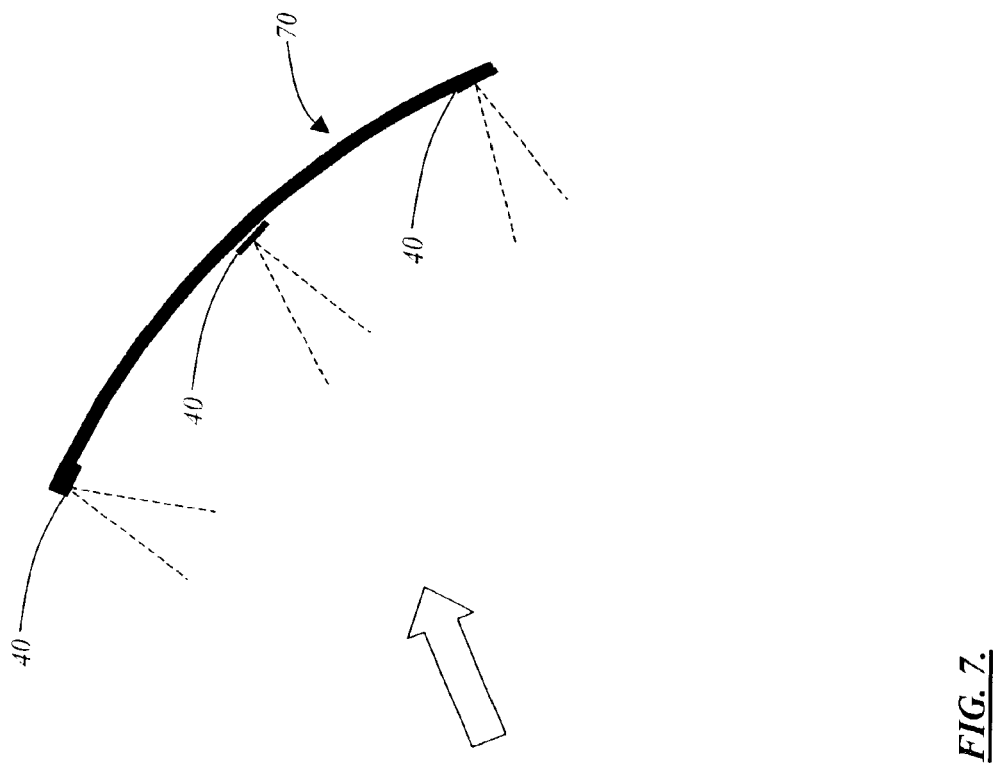
FIG. 7 is a schematic diagram illustrating a second plurality of possible configurations of the reflective element of the optical read/write pick-up mechanism of the present invention.
Figure 7:
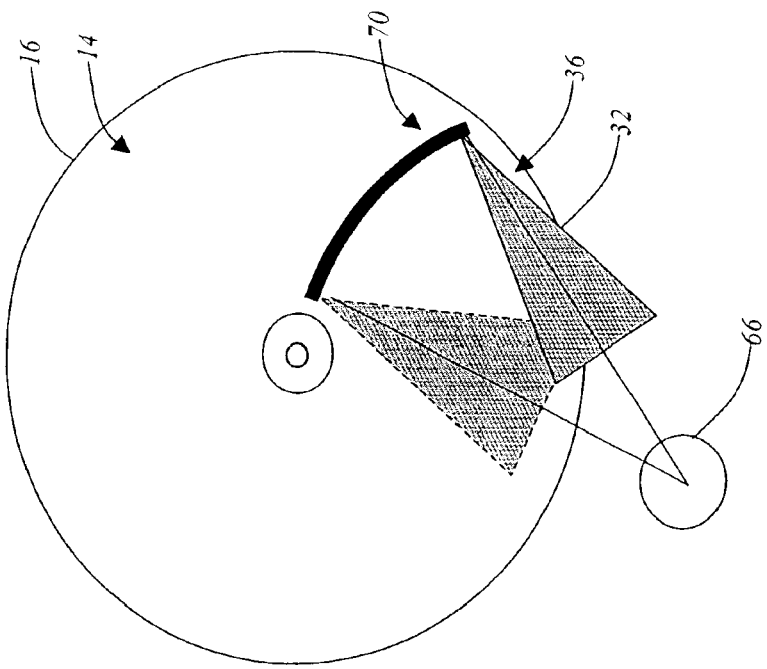
Figure 8:
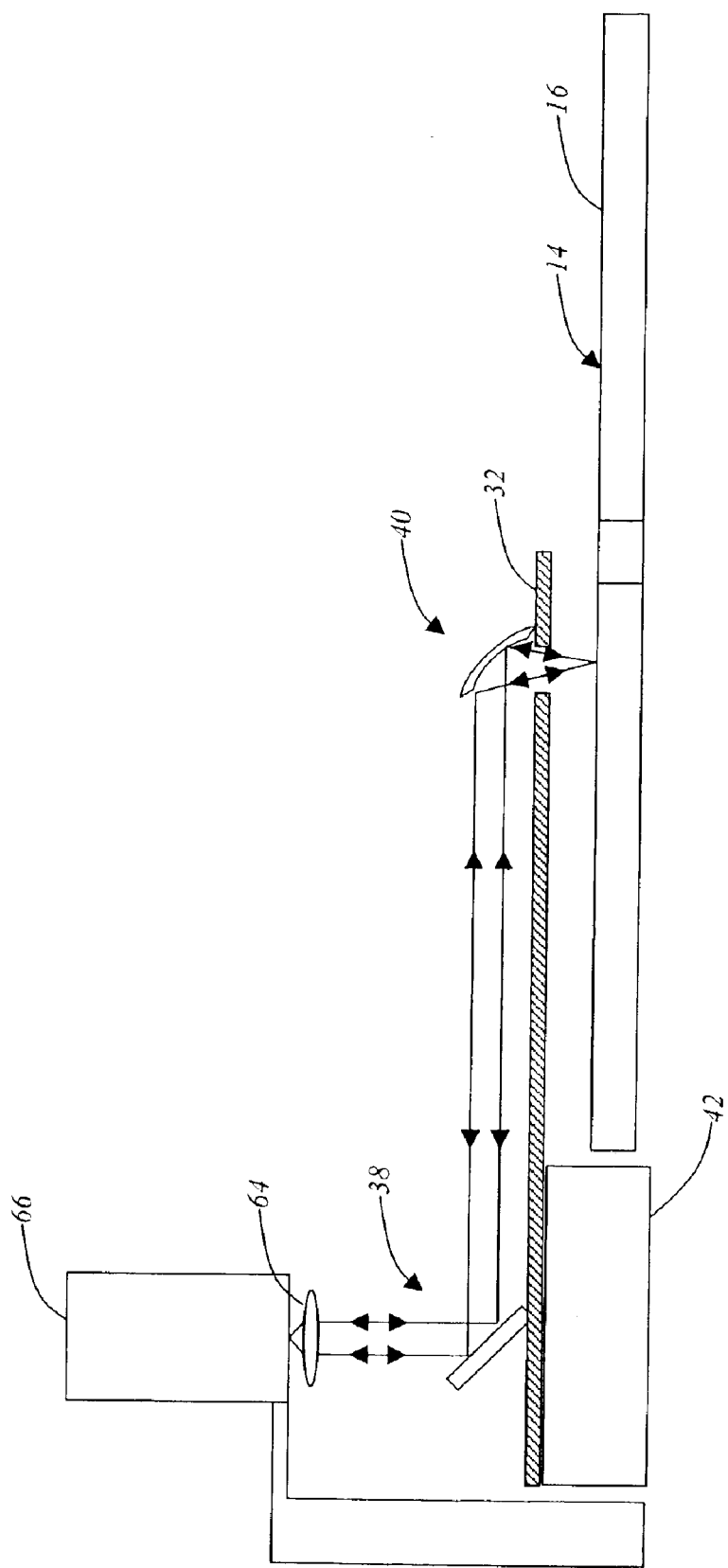
FIG. 8 is a cross-sectional side view of one embodiment of an optical read/write pick-up mechanism suitable for use with the reflective element configuration of FIG. 7.

Referring to FIG. 7, in a still further embodiment of the present invention, the reflective element 40 attached to or integrally formed with the second end 36 of the pivotable structure 32 is also preferably configured such that it maintains a constant 90-degree reflection angle with respect to the remote optical pick-up module 66 as it sweeps an arc 70 across the surface 14 of the optical storage medium 16. Optionally, the reflective element 40 may take the form of a substantially flat/curved structure or the like. In the embodiment shown, the remote optical pick-up module 66 is coupled to and/or is substantially in line with the pivotable structure 52. An exemplary optical read/write pick-up mechanism 80 suitable for use with this reflective element configuration is shown in FIG. 8.

Figure 9:
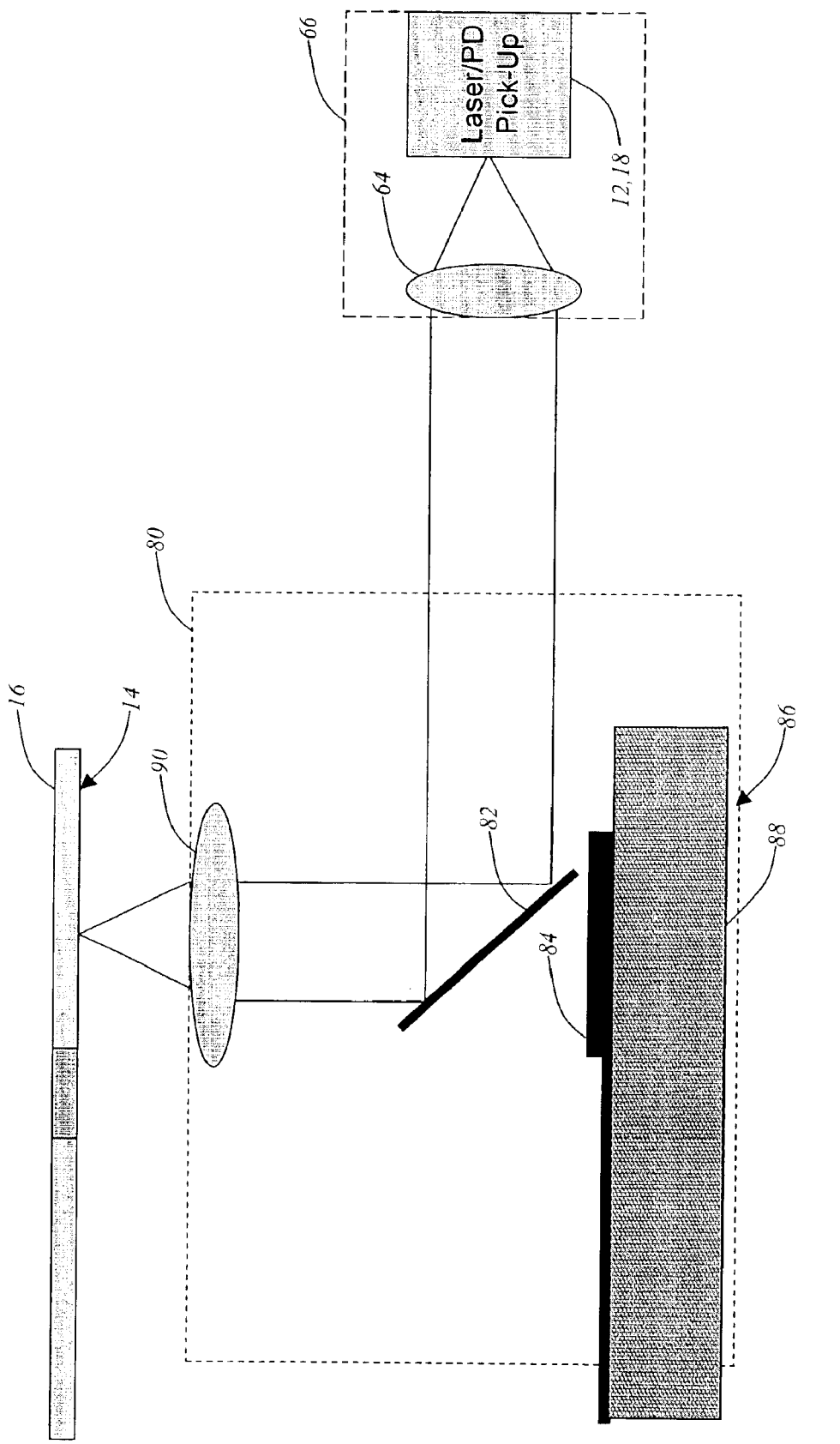
FIG. 9 is a cross-sectional side view of a further embodiment of the optical read/write pick-up mechanism of the present invention, including a movable/deformable reflective element.

FIGS. 9–12 provide a plurality of alternative embodiments of the optical read/write pick-up mechanism of the present invention. Referring to FIG. 9, a medium weight optical pick-up module 80 includes a substantially flat reflective element 82, such as a microstructure mirror, a MEMS mirror, or the like, movably attached to a reflective element actuation device 84, such as an electrostatic comb drive or the like. Preferably, the reflective element actuation device 84 is operable for selectively rotating the reflective element 82. Both the reflective element 82 and the reflective element actuation device 84 are attached to the end 86 of the pivotable structure 88. The medium weight optical pick-up module 80 also includes a beam focuser/expander 90 operable for transmitting light to and/or from the reflective element 82 and the surface 14 of the optical storage medium 16 as shown. As described above, the remote optical pick-up module 66 includes the light source 12, the light receiving device 18, and one or more collimating optics devices 64 operable for transmitting light to and/or from the light source 12 and/or the light receiving device 18 and the reflective element 82 as shown.

Figure 10:
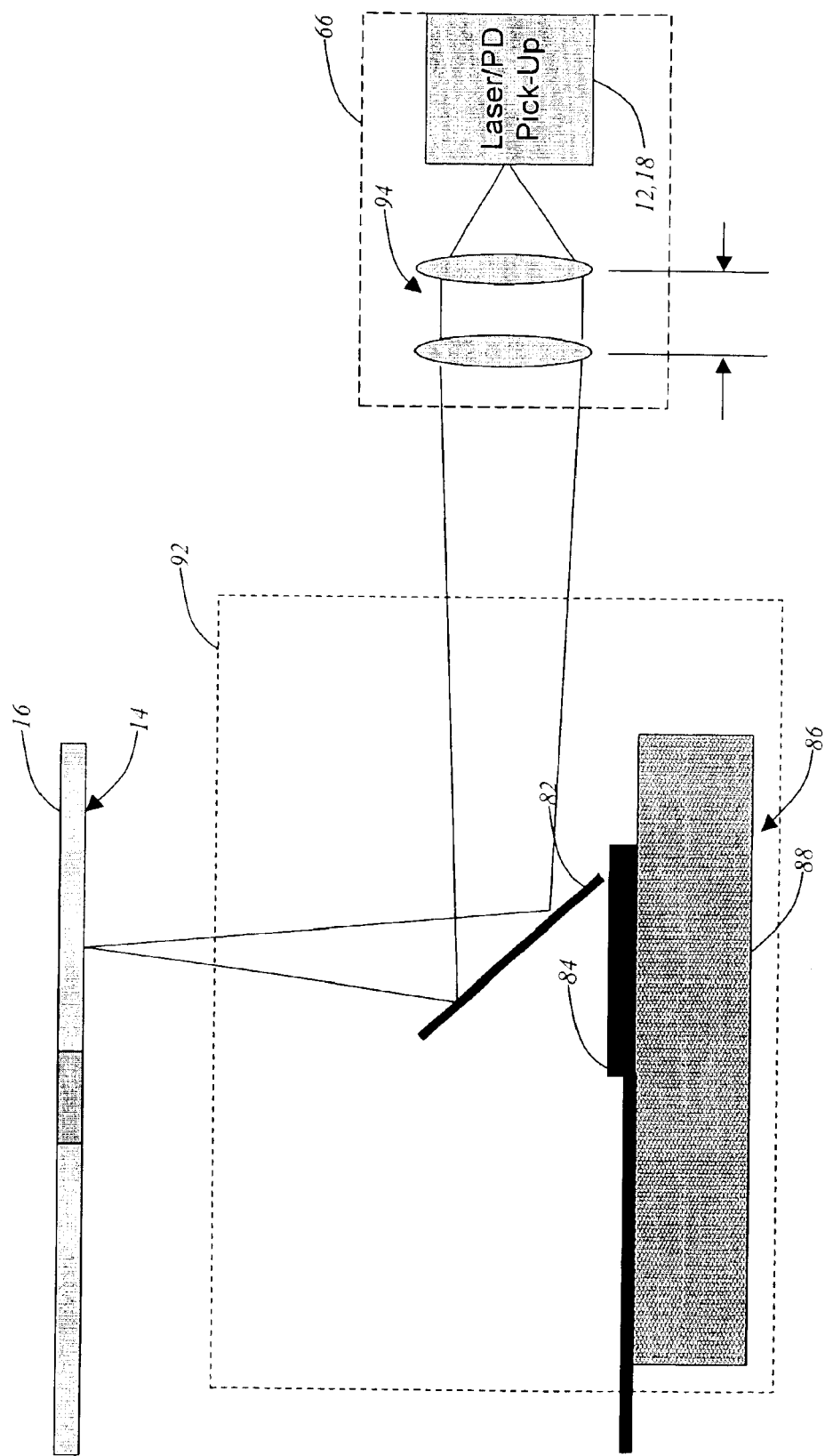
FIG. 10 is a cross-sectional side view of a still further embodiment of the optical read/write pick-up mechanism of the present invention, including a movable/deformable reflective element.

Referring to FIG. 10, another medium weight optical pick-up module 92 includes a substantially flat reflective element 82, such as a microstructure mirror, a MEMS mirror, or the like, movably attached to a reflective element actuation device 84, such as an electrostatic comb drive or the like. Preferably, the reflective element actuation device 84 is operable for selectively rotating the reflective element 82. Both the reflective element 82 and the reflective element actuation device 84 are attached to the end 86 of the pivotable structure 88. The medium weight optical pick-up module 92 or, alternatively, the remote optical pick-up module 66 also includes one or more compensating optical focal length correctors 94 operable for transmitting light to and/or from the light source 12 and/or the light receiving device 18 and the reflective element 82 as shown.

Figure 11:
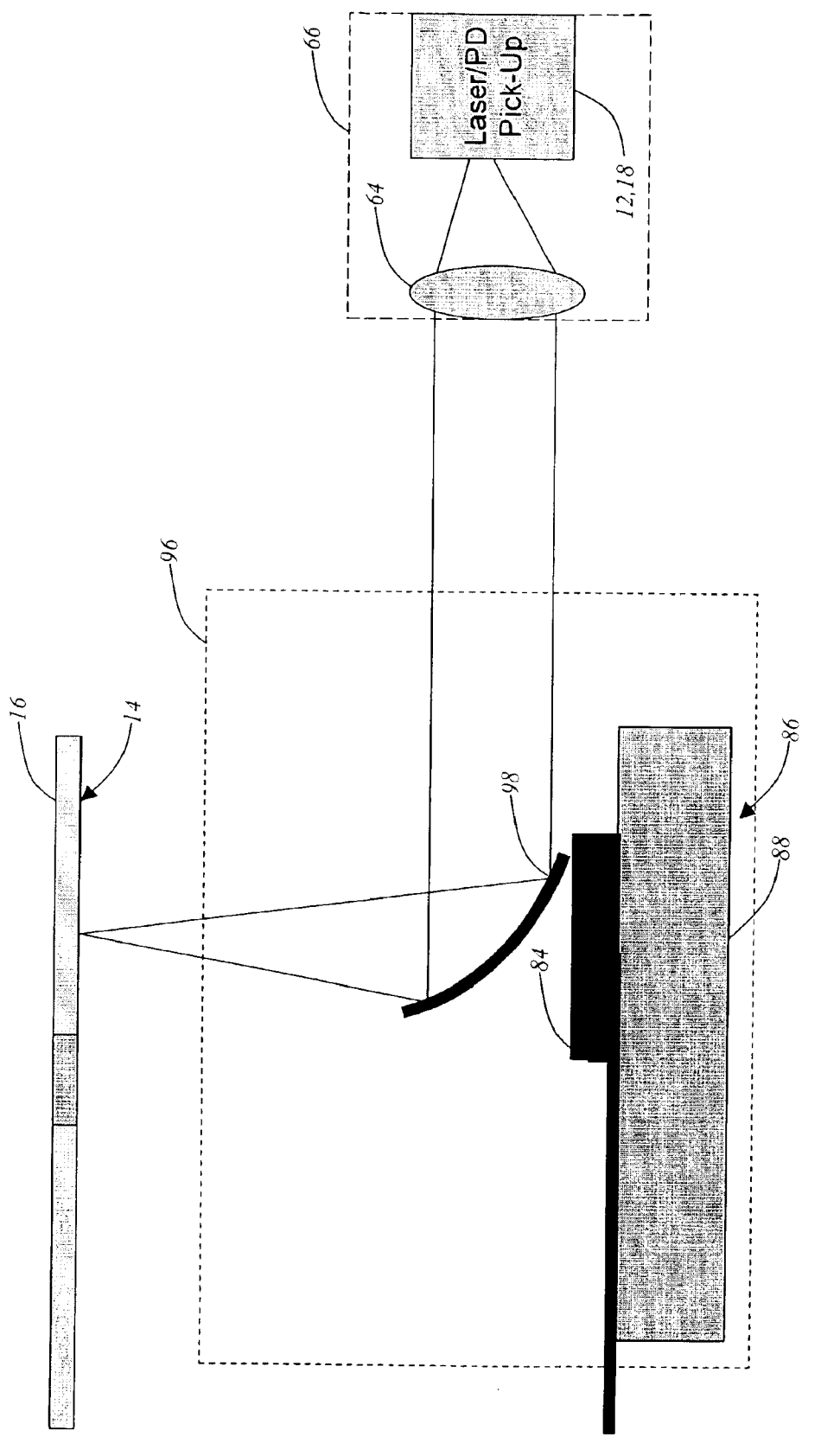
FIG. 11 is a cross-sectional side view of a still further embodiment of the optical read/write pick-up mechanism of the present invention, including a movable/deformable reflective element.

Referring to FIG. 11, a lightweight optical pick-up module 96 includes a substantially curved reflective element 98, such as a microstructure mirror, a MEMS mirror, or the like, movably attached to a reflective element actuation device 84, such as an electrostatic comb drive or the like. Preferably, the reflective element actuation device 84 is operable for selectively rotating the reflective element 98. In this embodiment, the reflective element 98 has a substantially curved shape suitable for transmitting light to and/or from the light source 12 and/or the light receiving device 18 and the surface 14 of the optical storage medium 16 as shown. Both the reflective element 98 and the reflective element actuation device 84 are attached to the end 86 of the pivotable structure 88. The remote optical pick-up module 66 includes one or more collimating optics devices 64 operable for transmitting light to and/or from the light source 12 and/or the light receiving device 18 and the reflective element 98 as shown.

Figure 12:
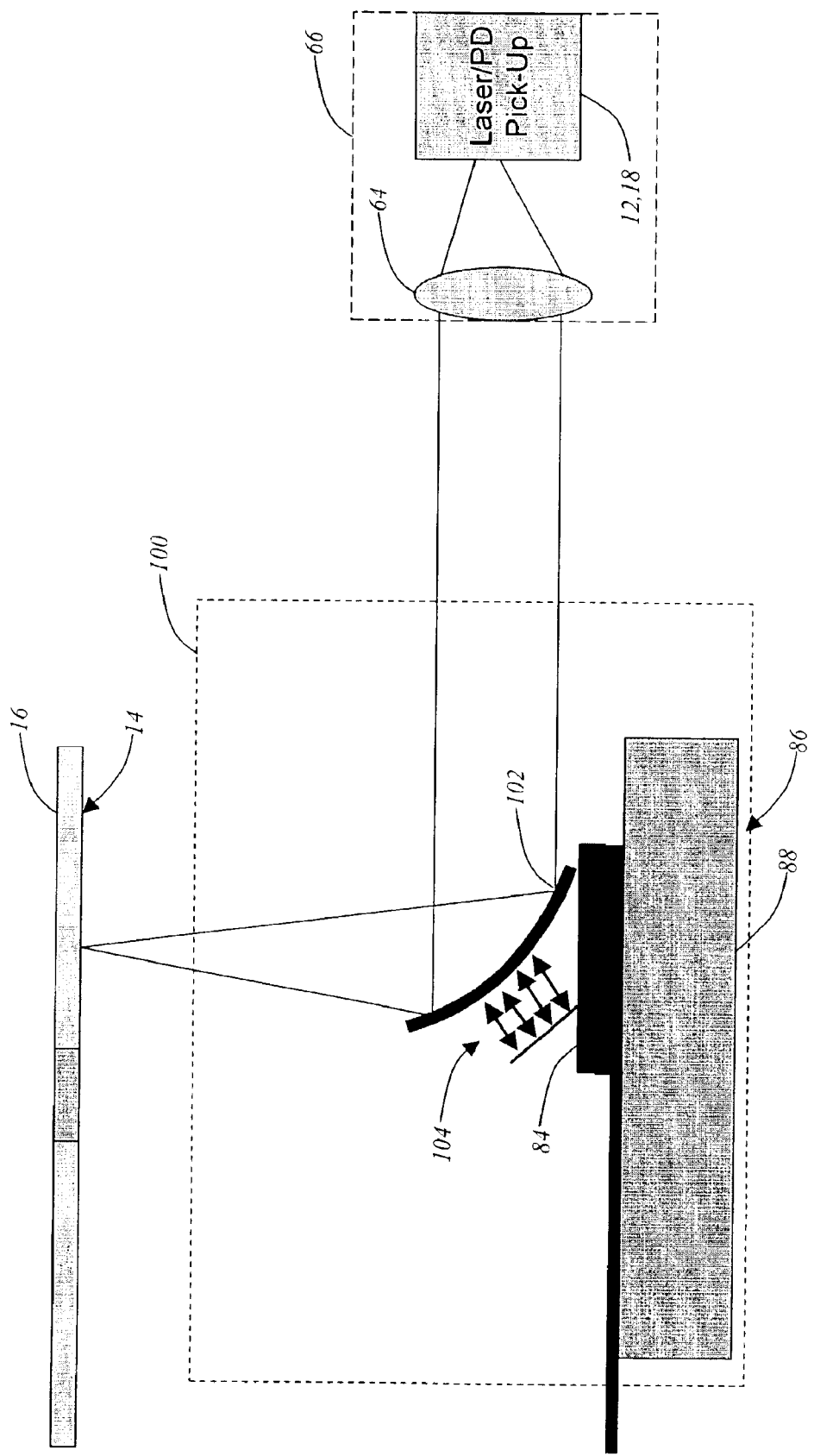
FIG. 12 is a cross-sectional side view of a still further embodiment of the optical read/write pick-up mechanism of the present invention, including a movable/deformable reflective element.

Referring to FIG. 12, another lightweight optical pick-up module 100 includes a substantially curved, deformable reflective element 102, such as a microstructure mirror, a MEMS mirror, or the like, movably attached to a reflective element actuation device 84, such as an electrostatic comb drive or the like. Preferably, the reflective element actuation device 84 is operable for selectively rotating the reflective element 102. In this embodiment, the reflective element 102 has a substantially curved shape suitable for transmitting light to and/or from the light source 12 and/or the light receiving device 18 and the surface 14 of the optical storage medium 16 as shown. The reflective element 102 is deformable and its curvature or shape may be selectively altered using a deformation mechanism 104. Both the reflective element 102 and the reflective element actuation device 84 are attached to the end 86 of the pivotable structure 88. The remote optical pick-up module 66 includes one or more collimating optics devices 64 operable for transmitting light to and/or from the light source 12 and/or the light receiving device 18 and the reflective element 98 as shown.

Figure 13:
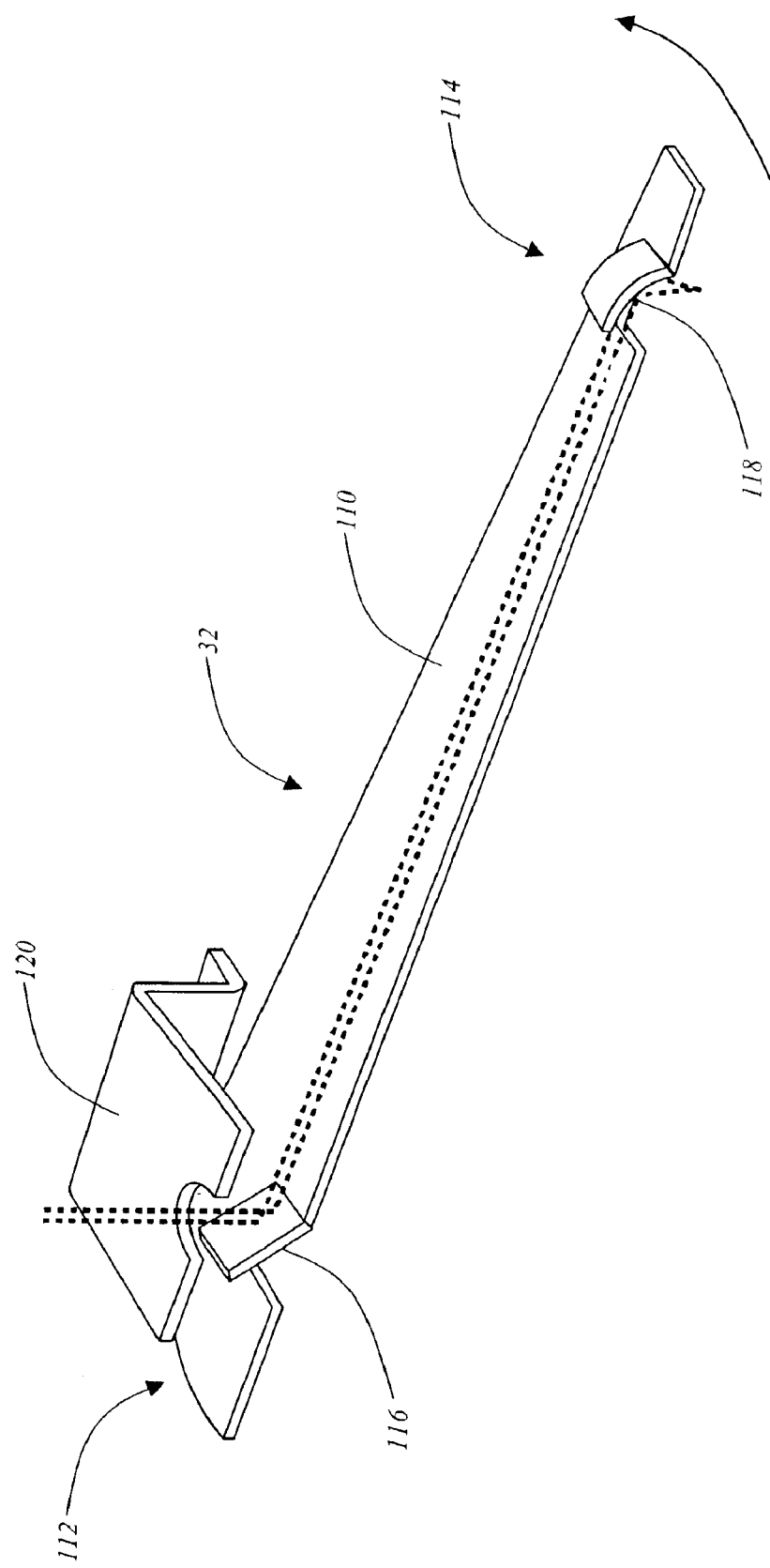
FIG. 13 is a perspective view of one embodiment of a pivotable structure and mounting bracket that may be used in conjunction with the optical read/write pick-up mechanism of the present invention.

Referring to FIG. 13, the pivotable structure 32 includes a pivotable arm 110 having a first end 112 and a second end 114. A first reflective element 116, such as a reflective mirror or the like, is attached to or integrally formed with the first end 112 of the pivotable arm 110. A second reflective element 118 is attached to or integrally formed with the second end 114 of the pivotable arm 110. The second end 118 of the pivotable arm 110 is positioned adjacent to and in a spaced-apart relationship with the surface of an optical storage medium (not shown). An actuation device (not shown), such as a voice coil motor, a servo mechanism, or the like, is coupled to the first end 112 of the pivotable arm 110 and, when actuated, causes the second end 114 of the pivotable arm 110 to move in a arc, parallel to the surface of the optical storage medium while the optical storage medium is spinning. Thus, the second reflective element 118 may be positioned adjacent to any selected portion of the surface of the optical storage medium. Optionally, a light source (not shown) is attached to and supported by a fixed or movable mounting bracket 120. Alternatively, the light source and a semi-reflective mirror (not shown) may be attached to the first end 112 of the pivotable arm 110 and move in coordination with the pivotable arm 110.

As described above, in various embodiments, the optical read/write pick-up mechanism of the present invention combines a microstructure or MEMS mirror, micro-optics, and servo control to allow remote pick-up by a fixed-position optical device. The optical read/write pick-up mechanism of the present invention uses a MEMS electrostatic rotary actuator or the like, providing substantial immunity to vibration under closed-loop servo control. This MEMS electrostatic rotary actuator improves relative system performance and reduces relative system cost. The electrostatic control of the microstructure or MEMS mirror provides for active, in-use optical alignment across an optical storage medium to a fixed-position optical target. Low-cost, passive assembly steps may be performed and a wide variety of light sources and light receiving devices may be used, allowing for effective weight/size, power, and thermal management and stability.

Figure 14:
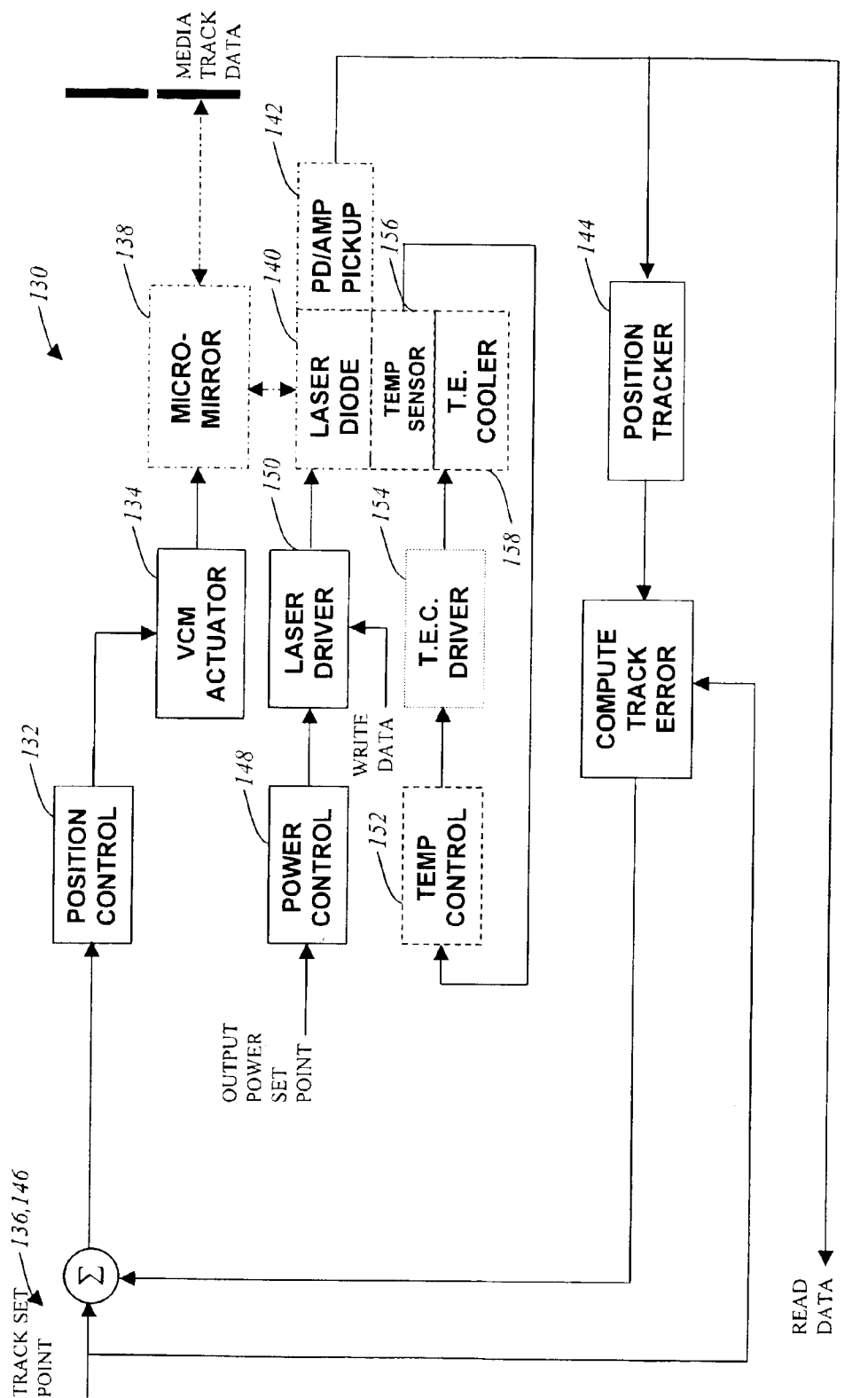
FIG. 14 is a schematic control diagram illustrating one embodiment of an optical media system that may be associated with and use the optical read/write pick-up mechanism of the present invention.

Referring to FIG. 14, one embodiment of an optical media system 130 that may be associated with and use the optical read/write pick-up mechanism of the present invention includes a position control 132 in electrical communication with a voice coil motor ("VCM") actuator 134 or the like. The position control 132 is operable for receiving a track set point 136 and directing the VCM actuator 134 to move the microstructure or MEMS mirror 138 to a predetermined location or to place the microstructure or MEMS mirror 138 in a predetermined orientation. The microstructure or MEMS mirror 138 is in optical communication with the light source 140, such as the laser diode or the like, and/or the light receiving device 142, such as the photodiode or the like, with or without an amplifier. The optical media system 130 also includes a position tracker 144 operable for sensing and communicating the position of the VCM actuator 134 and the microstructure or MEMS mirror 138, and the track error associated therewith, to the position control 132 as a track set point correction 146. The optical media system 130 further includes a power control 148 and a laser driver 150 operable for powering and controlling the light source 140 and a temperature control 152, a TEC driver 154, a temperature sensor 156, and a TE cooler 158 operable for regulating the temperature of the optical media system 130.

Figure 15:
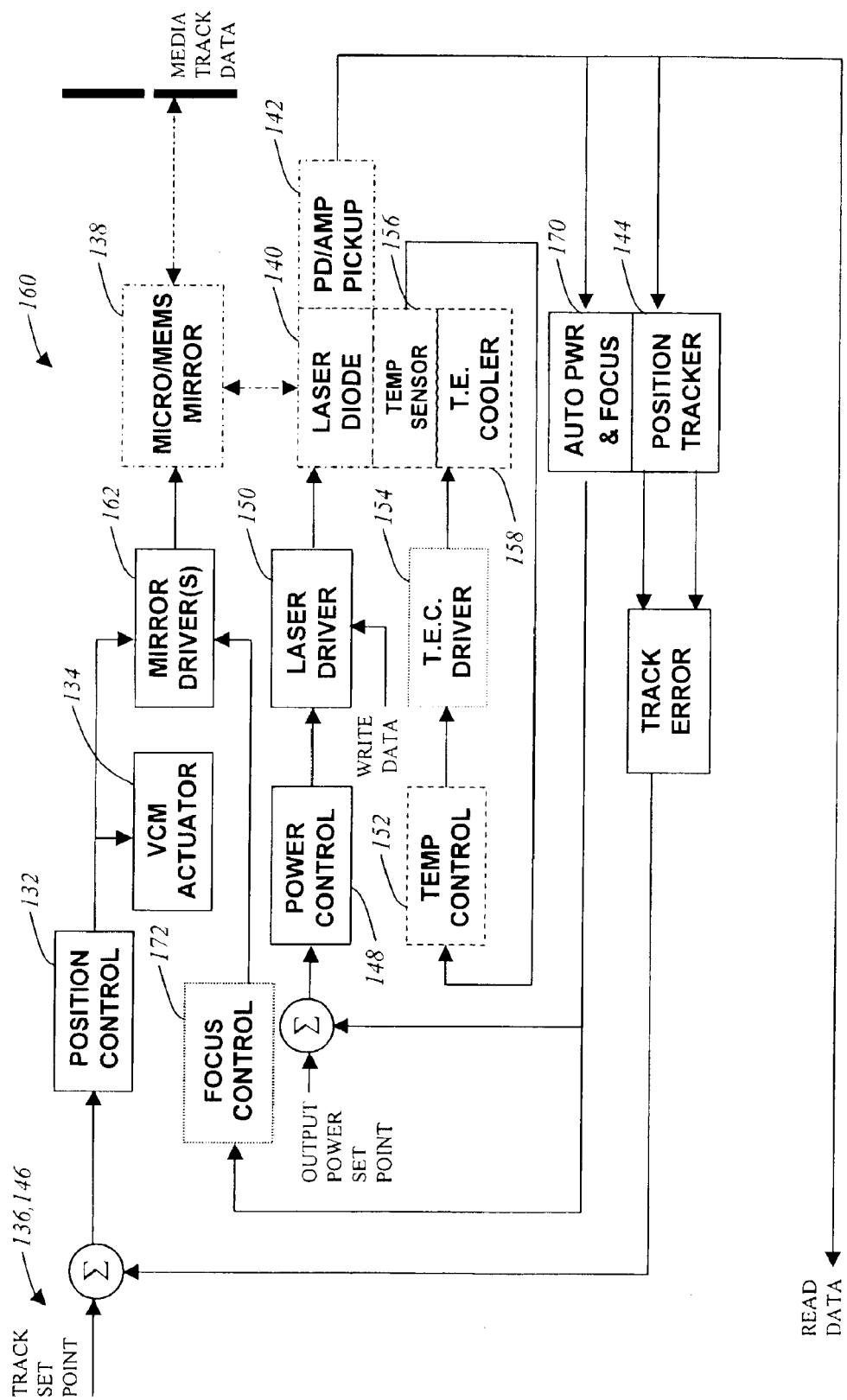
FIG. 15 is a schematic control diagram illustrating another embodiment of an optical media system that may be associated with and use the optical read/write pick-up mechanism of the present invention.

Referring to FIG. 15, another embodiment of an optical media system 160 that may be associated with and use the optical read/write pick-up mechanism of the present invention includes a position control 132 in electrical communication with a VCM actuator 134 or the like and one or more mirror drivers 162 or the like. The position control 132 is operable for receiving a track set point 136 and directing the VCM actuator 134 to move the microstructure or MEMS mirror 138 to a predetermined location. The one or more mirror drivers 162 are operable for receiving the track set point 136 and placing the microstructure or MEMS mirror 138 in a predetermined orientation. The microstructure or MEMS mirror 138 is in optical communication with the light source 140, such as the laser diode or the like, and/or the light receiving device 142, such as the photodiode or the like, with or without an amplifier. The optical media system 160 also includes a position tracker 144 operable for sensing and communicating the position of the VCM actuator 134 and the microstructure or MEMS mirror 138, and the track error associated therewith, to the position control 132 as a track set point correction 146. The optical media system 160 further includes an auto power and focus tracker 170 and focus control 172 operable for sensing and controlling the settings of the light source, and the deviation of these settings from one or more preferred settings. The optical media system 160 still further includes a power control 148 and a laser driver 150 operable for powering and controlling the light source 140 and a temperature control 152, a TEC driver 154, a temperature sensor 156, and a TE cooler 158 operable for regulating the temperature of the optical media system 160.

With respect to the reflective element described above, and specifically the MEMS mirror, a surface micromachined ("SMM") mirror or deep reactive ion etched ("DRIE") mirror may be utilized. The SMM mirror is a specialty mirror that incorporates both the optics systems and the actuation systems into one design. The DRIE mirror is also a specialty mirror, however, the optics systems and the actuation systems may be separated. Thus, the DRIE mirror provides a high degree of control and flexibility. Either the SMM mirror or the DRIE mirror may be manufactured using a suitable specialty metal or the like and coated with a specialty coating. These mirrors may be actuated using electrostatic, electromagnetic, or thermal techniques. A LIGA mirror, incorporating a plated metal or the like formed in a high-aspect ratio mold, may also be used. Likewise, a continuous membrane deformable mirror ("CMDM") may also be used.

Figure 16:
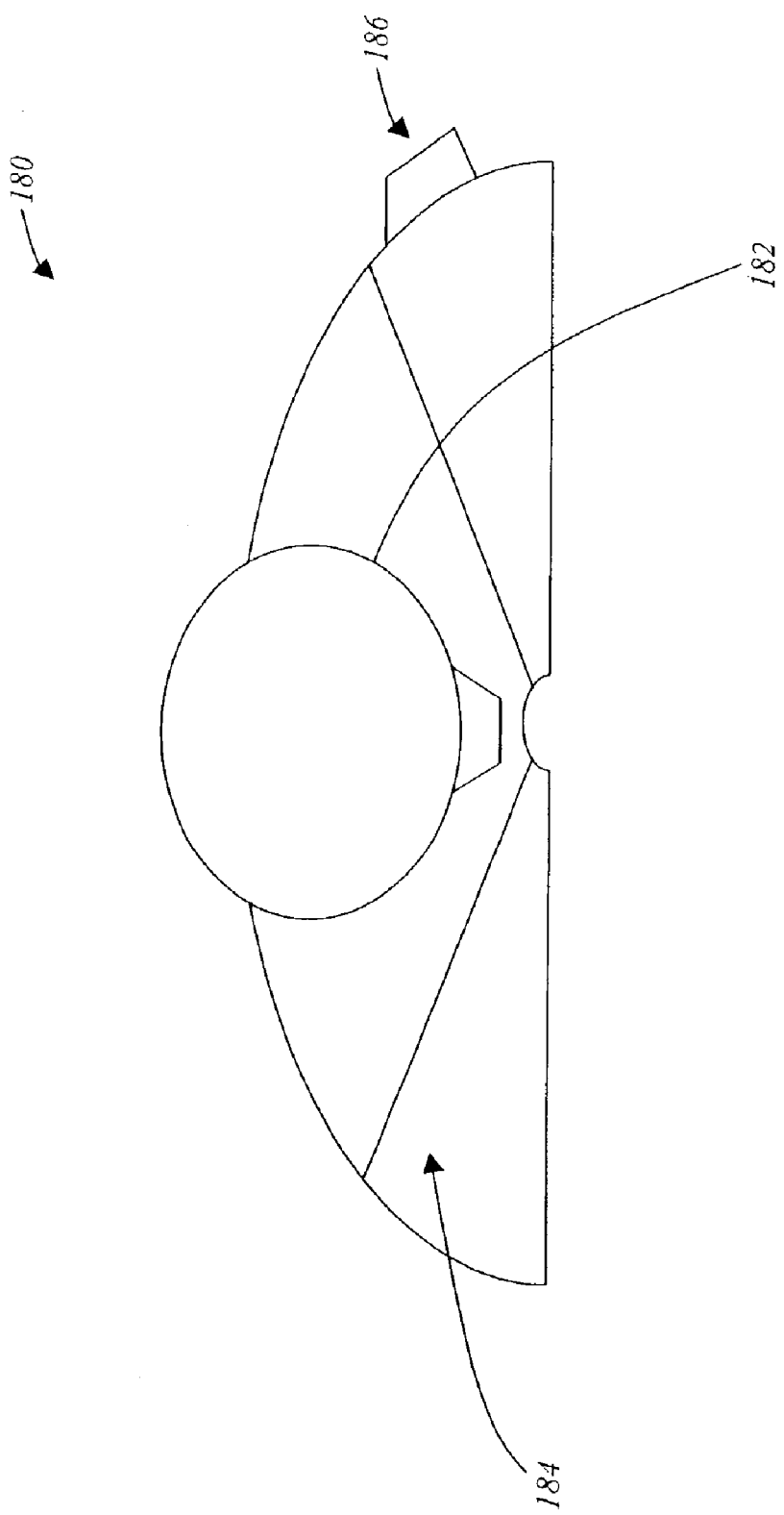
FIG. 16 is a perspective view of one embodiment of a moveable micro-electromechanical systems ("MEMS") mirror system that may be used in conjunction with the optical read/write pick-up mechanism of the present invention.

FIG. 16 illustrates one embodiment of a mirror system 180 that may be used in conjunction with the optical read/write pick-up mechanism of the present invention. The mirror system 180 includes a mirror element 182 actuated by a plurality of combs 184 forming an electrostatic comb drive actuator. The actuation of the mirror element 182 is limited by a mechanical stop 186. The mirror element 182 is, for example, a lithographically-fabricated Si mirror and may be attached to a plurality of flexural rotary suspensions. The mirror element 182 may be actuated, or rotated, by applying up to about 140V to the electrostatic comb drive actuator 184. Preferably, about 12–24V are applied to the electrostatic comb drive actuator 184 to actuate, or rotate, the mirror element 182 about a pivot point, allowing for continuous tracking. The electrostatic comb drive actuator 184 may be fabricated in single-crystal Si using DRIE techniques, for example. The relatively high aspect ratio of the plurality of combs 184 provides relatively high out-of-plane stiffness and actuator force.

Figure 17:
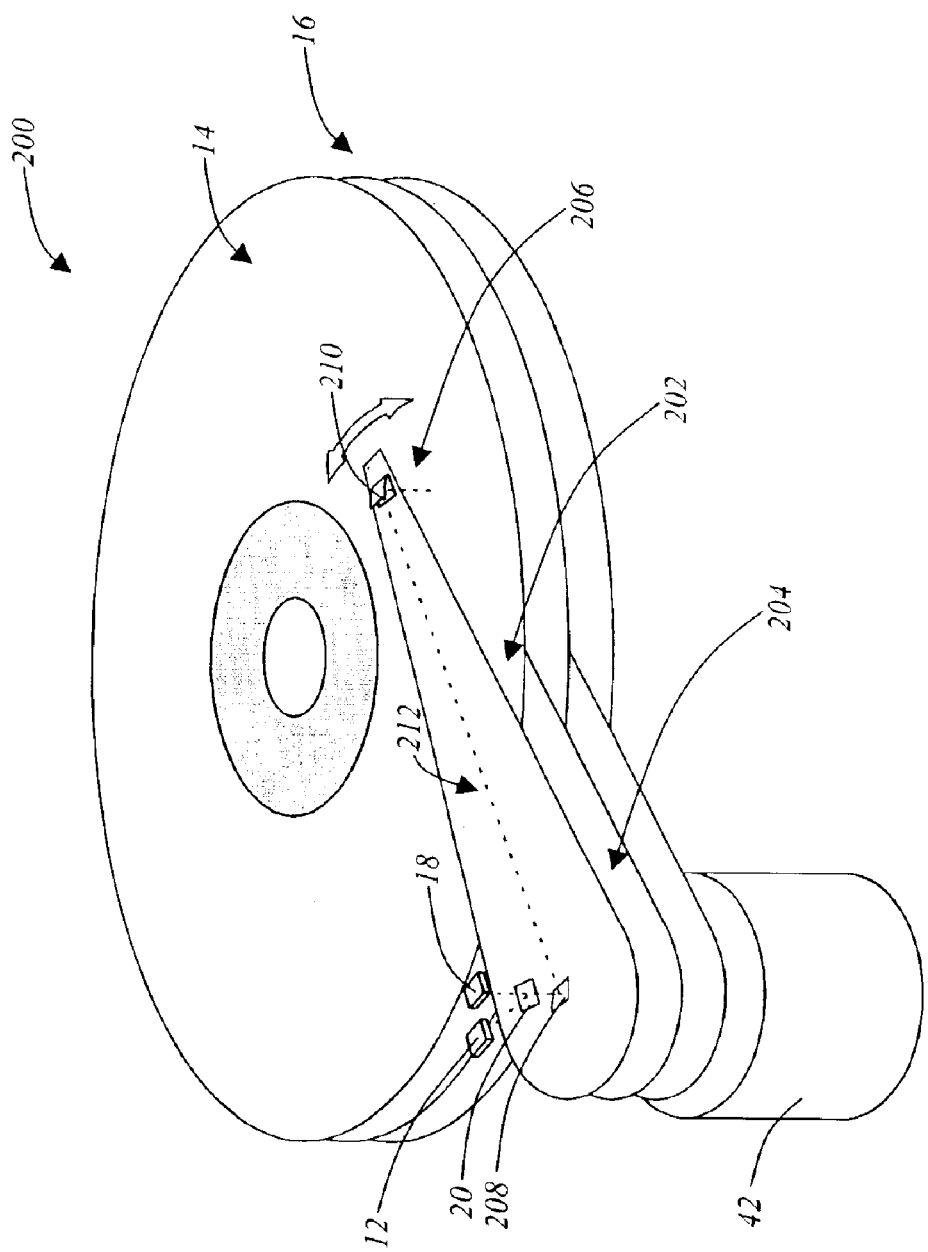
FIG. 17 is a perspective view of one embodiment of the high-capacity optical read/write pick-up mechanism of the present invention.

Referring to FIG. 17, in a further embodiment of the present invention, a high-capacity optical read/write pick-up mechanism 200 operable for reading data from and/or writing data to the surfaces 14 of a plurality of optical storage media 16, such as a plurality of CDs, DVDs, or the like, includes a plurality of pivotable structures 202, such as a plurality of pivotable arms or the like, each of the plurality of pivotable structures 202 having a first end 204 and a second end 206. A plurality of first reflective elements 208, such as a plurality of reflective mirrors or the like, are attached to or integrally formed with the first end 204 of each of the plurality of pivotable structures 202. A plurality of second reflective elements 210 are attached to or integrally formed with the second end 206 of each of the plurality of pivotable structures 202. The second end 206 of each of the plurality of pivotable structures 202 is positioned adjacent to and in a spaced-apart relationship with the surface 14, top or bottom, of a predetermined or selected optical storage medium 16. An actuation device 42, such as a voice coil motor, a servo mechanism, or the like, is coupled to the first end 204 of each of the plurality of pivotable structures 202 and, when actuated, causes the second end 206 of each of the plurality of pivotable structures 202 to move in an arc, parallel to the surface 14 of the optical storage medium 16 while the optical storage medium 16 is spinning. Thus, each of the plurality of second reflective elements 210 may be positioned adjacent to any selected portion of the surface 14, top or bottom, of each of the plurality of optical storage media 16.

A light source 12, such as a laser diode or the like, and a semi-reflective mirror 20 are positioned in proximity to the first end of each of the plurality of pivotable structures 202 and the plurality of first reflective elements 208. Optionally, the light source 12 is attached to and supported by a fixed or movable mounting bracket (not shown). Further, the light source 12 and the semi-reflective mirror 20 may be attached to the first end 204 of one of the plurality of pivotable structures 202 and move in coordination with the plurality of pivotable structures 202.

As described above, the light source 12 is operable for generating and transmitting light, such as laser light or the like, to the semi-reflective mirror 20. The light is then transmitted to a predetermined or selected one of the plurality of first reflective elements 208, a predetermined or selected one of the plurality of second reflective elements 210, and the top or bottom surface 14 of a predetermined or selected one of the plurality of optical storage media 16. The light generated by the light source 12 may be encoded with data or un-encoded. Light from the surface 14 of the optical storage medium 16 is transmitted to the corresponding second reflective element 210 and the corresponding first reflective element 208, and is received by a light receiving device 18, such as a photodiode or the like. Again, the light received by the light receiving device 18 may be encoded with data or un-encoded.

Thus, using the light, a predetermined or selected the optical path 212 formed between a given first reflective element 208 and a given second reflective element 210, and free space optics, data may be read from and/or written to the surface 14, top or bottom, of a given optical storage medium 16. As will be described in greater detail herein below and as is well known to those of ordinary skill in the art, the form and content of this data, its encoding/decoding, and the positioning of the plurality of pivotable structures 202 may be controlled by one or more processors/controllers (not shown).

Figure 18:
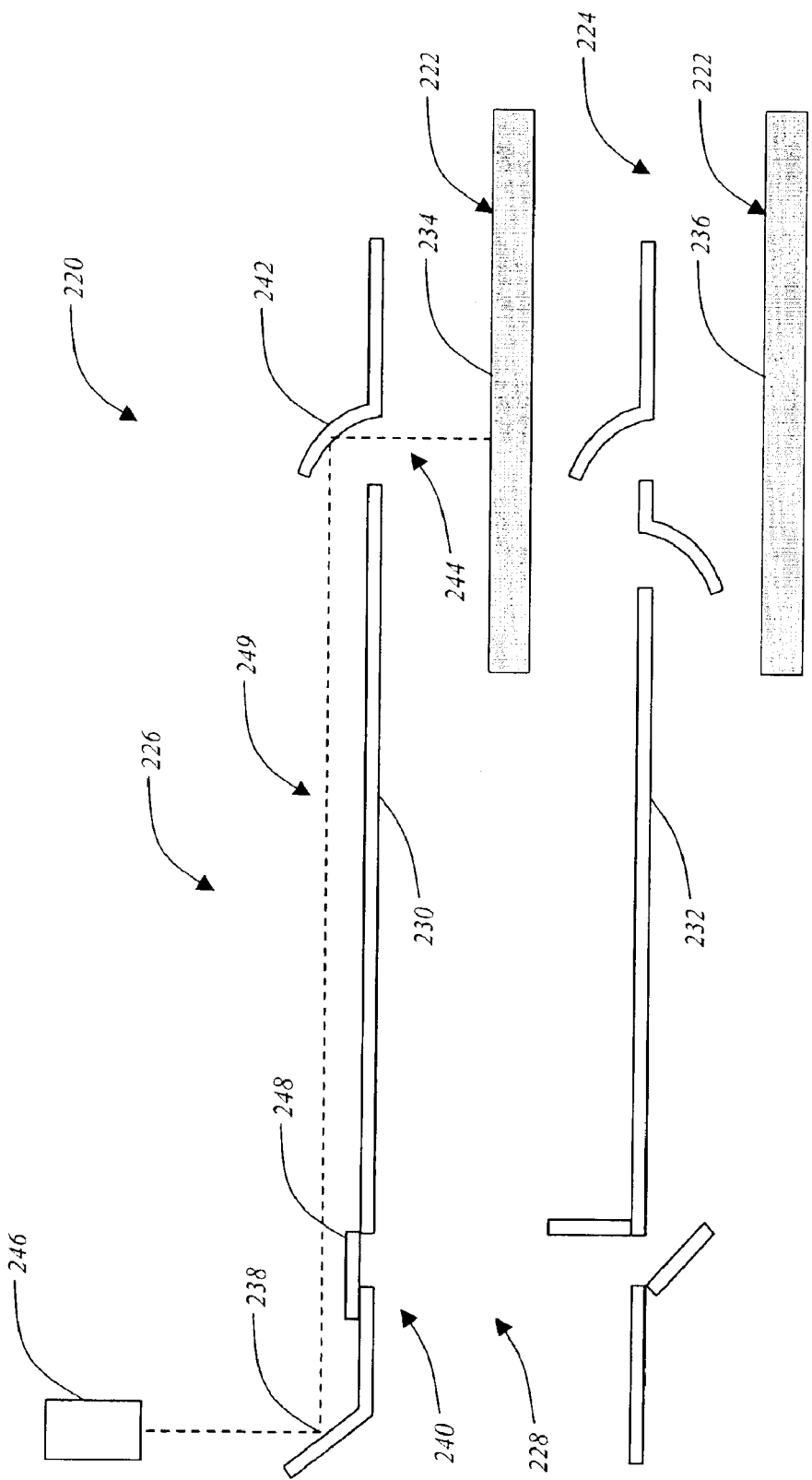
FIG. 18 is a schematic diagram illustrating another embodiment of the high-capacity optical read/write pick-up mechanism of the present invention, highlighting a first configuration suitable for reading data from and/or writing data to the top surface of one of a plurality of optical storage media.

Referring to FIG. 18, in a first configuration 220 suitable for reading data from and/or writing data to the top surface 222 of one of a plurality of optical storage media 224, the optical read/write pick-up mechanism 226 of the present invention includes a plurality of pivotable structures 228. In the example shown, the plurality of pivotable structures 228 include a first pivotable structure 230 and a second pivotable structure 232. The plurality of optical storage media 224 include a first optical storage medium 234 and a second optical storage medium 236. A first reflective element 238 is attached to or integrally formed with a first end 240 of the first pivotable structure 230 and a second reflective element 242 is attached to or integrally formed with a second end 244 of the first pivotable structure 230. A light source/light receiving device 246, such as a laser diode/photodiode or the like, is disposed adjacent to the first reflective element 238 and is operable for transmitting light, such as laser light, to and receiving light, such as laser light, from the first reflective element 238, the second reflective element 242, and the top surface 222 of the first optical storage medium 234 along a first optical path 249 when a third reflective element 248 attached to the first pivotable structure 230 is in a "closed" configuration. The third reflective element 248 may be a MEMS mirror or the like.

Figure 19:
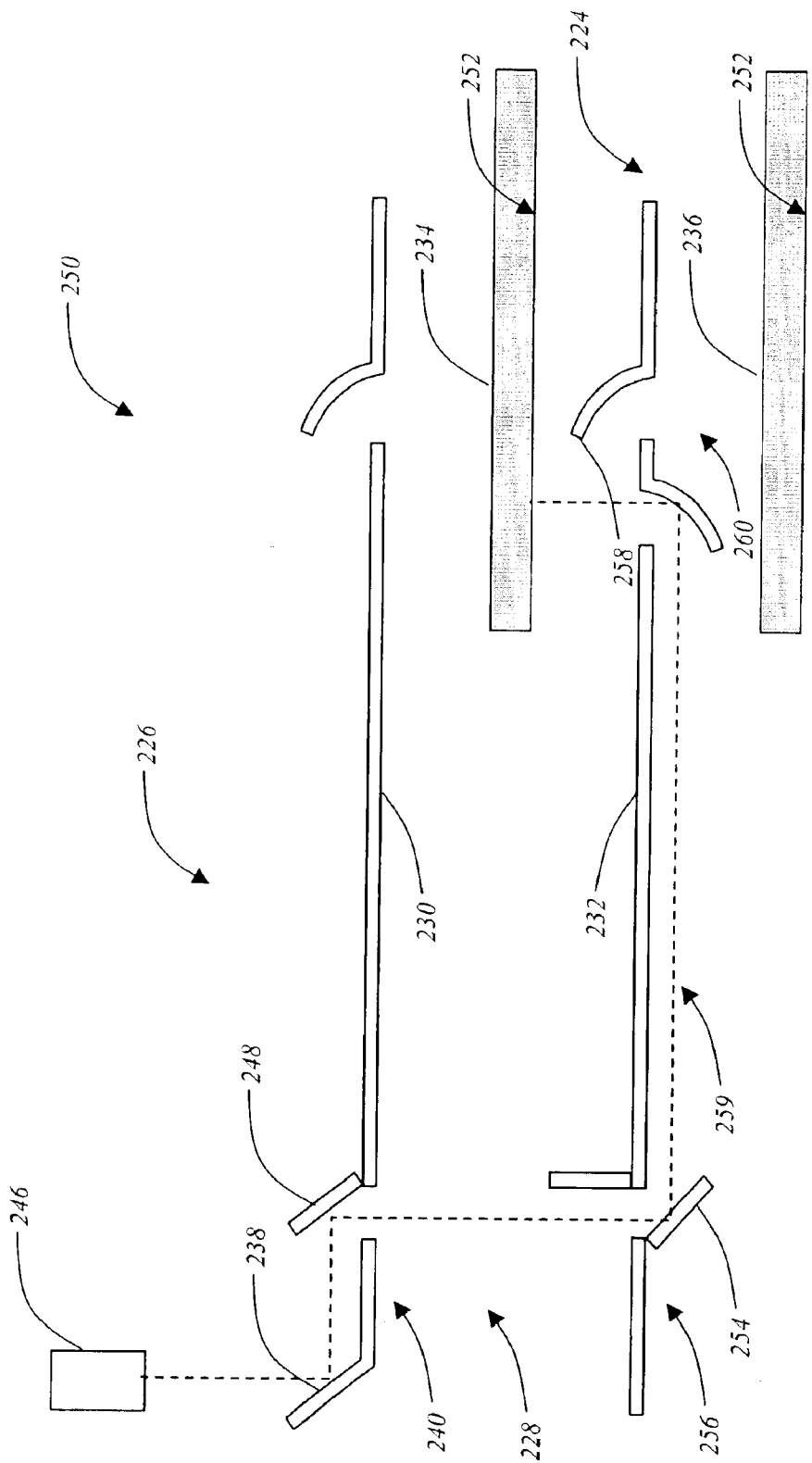
FIG. 19 is a schematic diagram illustrating a further embodiment of the high-capacity optical read/write pick-up mechanism of the present invention, highlighting a second configuration suitable for reading data from and/or writing data to the bottom surface of one of a plurality of optical storage media.

Referring to FIG. 19, in a second configuration 250 suitable for reading data from and/or writing data to the bottom surface 252 of one of a plurality of optical storage media 224, the optical read/write pick-up mechanism 226 of the present invention includes a plurality of pivotable structures 228. In the example shown, the plurality of pivotable structures 228 include a first pivotable structure 230 and a second pivotable structure 232. The plurality of optical storage media 224 include a first optical storage medium 234 and a second optical storage medium 236. A fourth reflective element 254 is attached to or integrally formed with a first end 256 of the second pivotable structure 232 and a fifth reflective element 258 is attached to or integrally formed with a second end 260 of the second pivotable structure 232. Again, the light source/light receiving device 246, such as the laser diode/photodiode or the like, is disposed adjacent to the first reflective element 238 and is operable for transmitting light, such as laser light, to and receiving light, such as laser light, from the first reflective element 238, the third reflective element 248, the fourth reflective element 254, the fifth reflective element 258, and the bottom surface 252 of the first optical storage medium 234 along a second optical path 259 when the third reflective element 248 attached to the first pivotable structure 230 is in an "open" configuration and a sixth reflective element 262 attached to the first end 256 of the second pivotable structure 232 is also in an "open" configuration. As described above, any or all of the reflective elements may be a MEMS mirror or the like.

Figure 20:
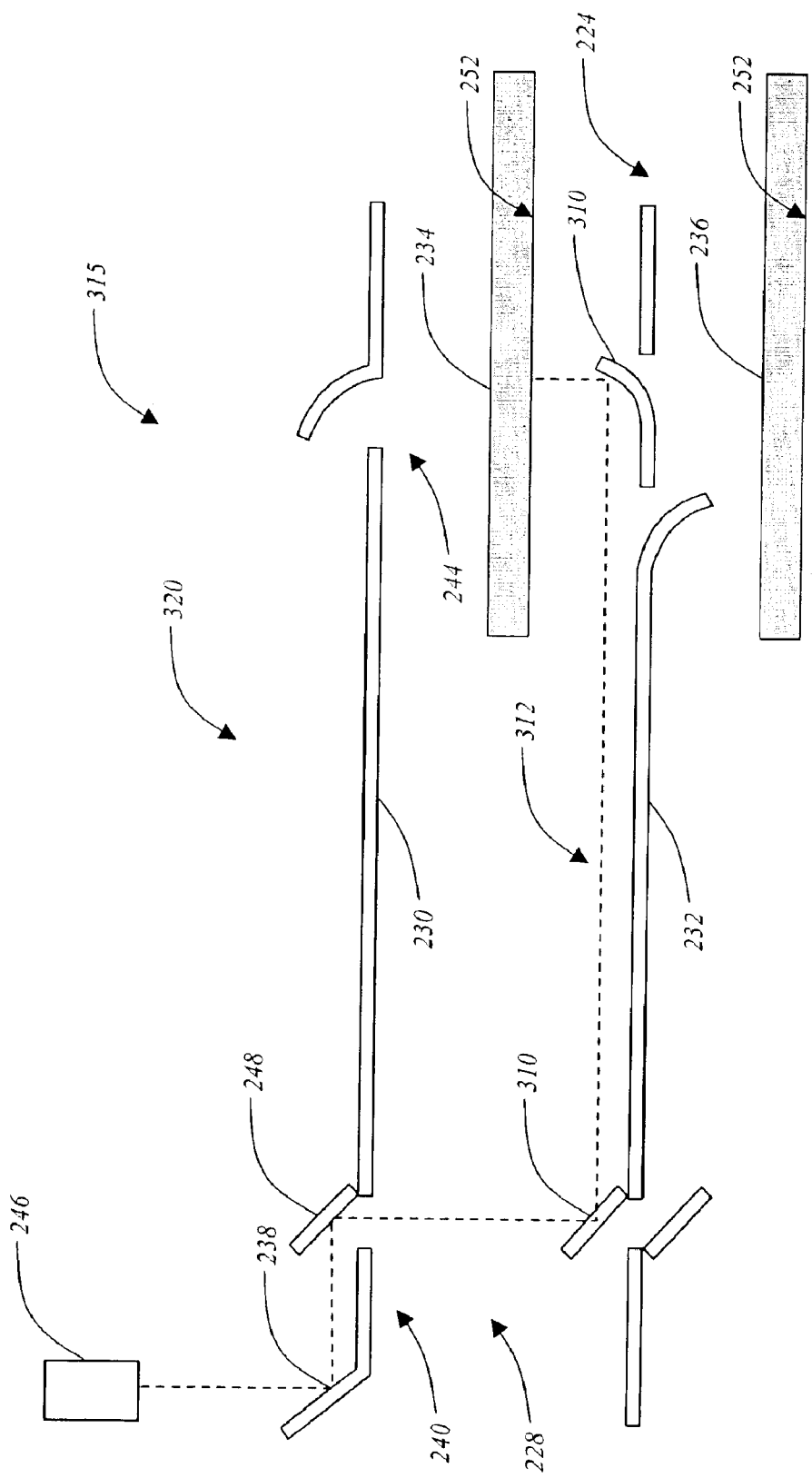
FIG. 20 is a schematic diagram illustrating a still further embodiment of the high-capacity optical read/write pick-up mechanism of the present invention, highlighting a third configuration suitable for reading data from and/or writing data to the bottom surface of one of a plurality of optical storage media.

Referring to FIG. 20, in a third configuration 315 suitable for reading data from and/or writing data to the bottom surface 252 of one of a plurality of optical storage media 224, the optical read/write pick-up mechanism 320 of the present invention includes a plurality of pivotable structures 228. In the example shown, the plurality of pivotable structures 228 include a first pivotable structure 230 and a second pivotable structure 232. The plurality of optical storage media 224 include a first optical storage medium 234 and a second optical storage medium 236. A first reflective element 248 is attached to or integrally formed with a first end 240 of the first pivotable structure 230 and a second reflective element 248 is also attached to or integrally formed with the first end 240 of the first pivotable structure 230. A third reflective element 310 is attached to or integrally formed with a first end 240 of the second pivotable structure 232 and a fourth reflective element 310 is attached to or integrally formed with a second end 244 of the second pivotable structure 232. Again, the light source/light receiving device 246, such as the laser diode/photodiode or the like, is disposed adjacent to the first reflective element 238 and is operable for transmitting light, such as laser light, to and receiving light, such as laser light, from the plurality of reflective elements and the bottom surface 252 of the first optical storage medium 234 along a third optical path 312. As described above, any or all of the reflective elements may be a MEMS mirror or the like.

Figure 21:
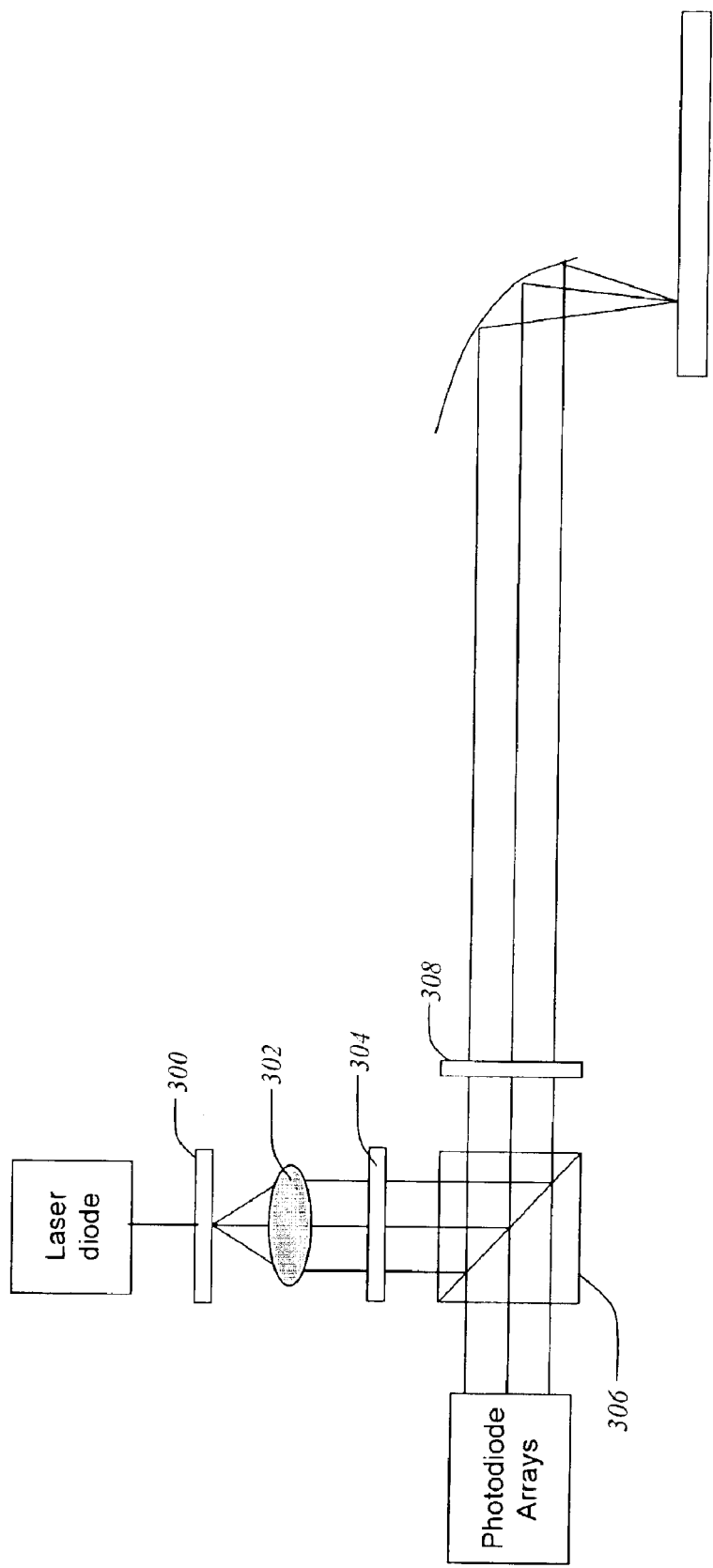
FIG. 21 is a schematic diagram illustrating a plurality of additional optical components that may be utilized in conjunction with the systems and methods of the present invention.

FIG. 21 illustrates a plurality of additional optical components that may be utilized in conjunction with the systems and methods of the present invention, including, but not limited to, an optical grating 300, a collimating lens 302, a polarizer 304, a polarizing beam splitter 306, and a retarder 308.

Advantageously, the high-capacity optical read/write pick-up mechanism of the present invention allows both sides, top and bottom, of an optical storage medium to be read from and/or written to, effectively doubling the capacity of the current generation of optical storage media. This allows relatively new audio and video compression techniques to be maximized and leveraged.

Figure 22:
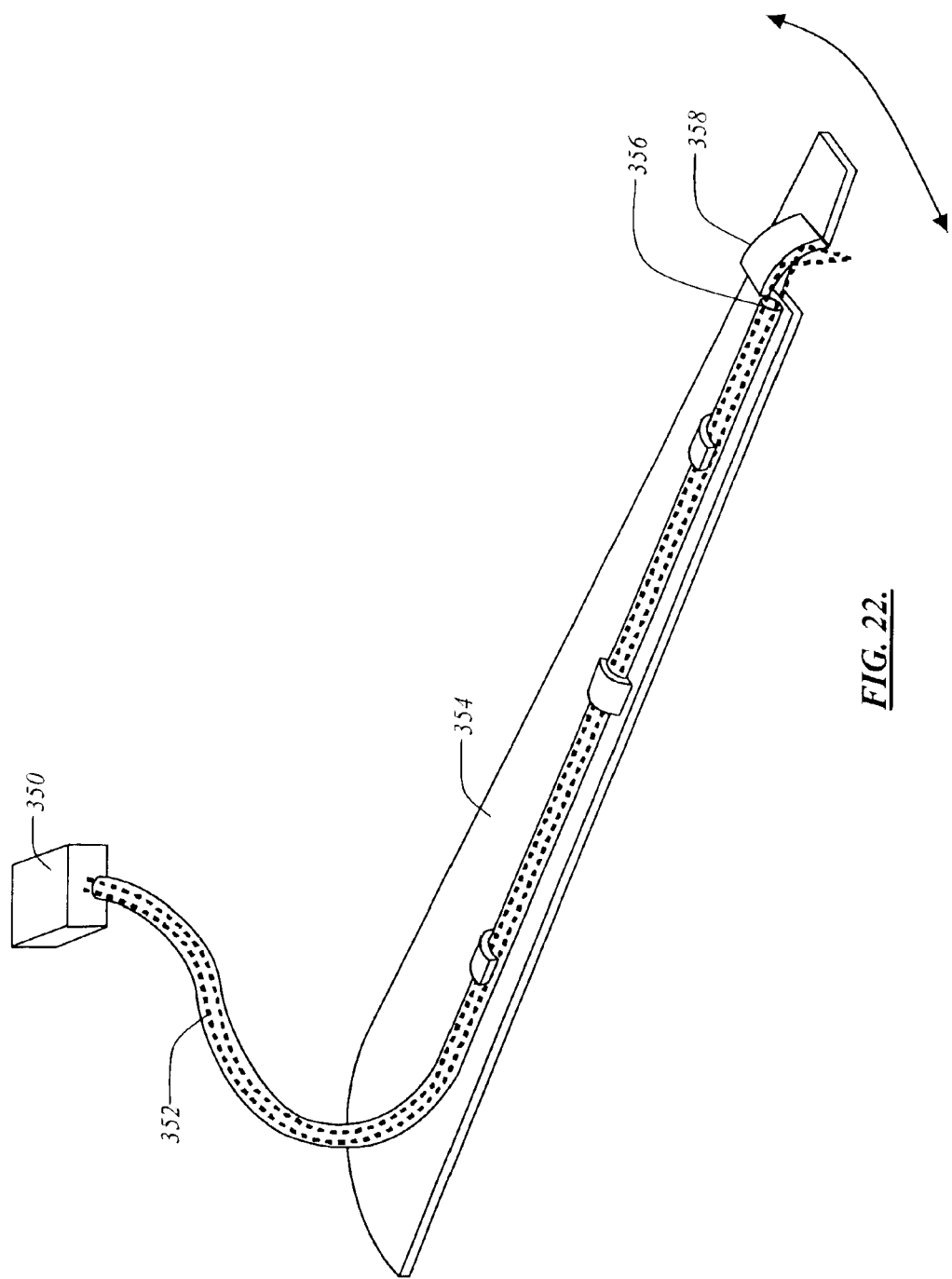
FIG. 22 is a perspective view of one embodiment of the optical read/write pick-up mechanism of the present invention, incorporating guided optics.

FIG. 22 illustrates a guided optics configuration of the optical read/write pick-up mechanism of the present invention, as described above, incorporating a laser/photodiode assembly 350, an optical fiber/waveguide 352, a moveable pick-up arm 354, collimating optics 356, and a reflective parabolic mirror 358.

It is apparent that there has been provided, in accordance with the systems and methods of the present invention, a high-speed, high-capacity optical read/write pick-up mechanism for use in an optical read/write system. Although the systems and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A high-speed pick-up mechanism operable for reading data from and/or writing data to an optical storage medium, the pick-up mechanism comprising:

a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium;

a reflective element associated with the second end of the pivotable structure, wherein the reflective element is operable for transmitting light to and/or receiving light from the surface of the optical storage medium;

a light source associated with the first end of the pivotable structure, wherein the light source is operable for transmitting light to the reflective element along an optical path;

a light receiving device associated with the first end of the pivotable structure, wherein the light receiving device is operable for receiving light from the reflective element along the optical path; and an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

2. The pick-up mechanism of claim 1, wherein the pivotable structure comprises a pivotable arm.

3. The pick-up mechanism of claim 1, wherein the reflective element comprises a reflective element selected from the group consisting of a microstructure mirror, a moveable micro-electromechanical systems mirror, and a rotatable micro-electromechanical systems mirror.

4. The pick-up mechanism of claim 1, wherein the reflective element is attached to the second end of the pivotable structure.

5. The pick-up mechanism of claim 1, wherein the reflective element is integrally formed with the second end of the pivotable structure.

6. The pick-up mechanism of claim 1, wherein the light comprises laser light.

7. The pick-up mechanism of claim 1, wherein the light source comprises a laser diode.

8. The pick-up mechanism of claim 1, wherein the optical path comprises an optical path selected from the group consisting of a free space optical path, a fiber-guided optical path, and a waveguide-guided optical path.

9. The pick-up mechanism of claim 1, wherein the light receiving device comprises a photodiode.

10. The pick-up mechanism of claim 1, wherein the actuation device comprises a voice coil motor.

11. The pick-up mechanism of claim 1, wherein the optical storage medium comprises an optical storage medium selected from the group consisting of a compact disc and a digital versatile disc.

12. A high-speed optical pick-up mechanism operable for reading data from and/or writing data to an optical storage medium, the optical pick-up mechanism comprising:

a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium;

a first reflective element associated with the second end of the pivotable structure, wherein the first reflective element is operable for transmitting light to and/or receiving light from the surface of the optical storage medium;

a second reflective element associated with the first end of the pivotable structure, wherein the second reflective element is operable for transmitting light to and/or receiving light from the first reflective element along an optical path;

a light source associated with the first end of the pivotable structure, wherein the light source is operable for transmitting light to the second reflective element along the optical path;

a light receiving device associated with the first end of the pivotable structure, wherein the light receiving device is operable for receiving light from the second reflective element along the optical path; and an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

13. The optical pick-up mechanism of claim 12, wherein the pivotable structure comprises a pivotable arm.

14. The optical pick-up mechanism of claim 12, wherein the first reflective element comprises a reflective element selected from the group consisting of a microstructure mirror, a moveable micro-electromechanical systems mirror, and a rotatable micro-electromechanical systems mirror.

15. The optical pick-up mechanism of claim 12, wherein the first reflective element is attached to the second end of the pivotable structure.

16. The optical pick-up mechanism of claim 12, wherein the first reflective element is integrally formed with the second end of the pivotable structure.

17. The optical pick-up mechanism of claim 12, wherein the optical path comprises an optical path selected from the group consisting of a free space optical path, a fiber-guided optical path, and a waveguide-guided optical path.

18. The optical pick-up mechanism of claim 12, wherein the light comprises laser light.

19. The optical pick-up mechanism of claim 18, wherein the light further comprises encoded laser light.

20. The optical pick-up mechanism of claim 12, wherein the light source comprises a laser diode.

21. The optical pick-up mechanism of claim 12, wherein the light receiving device comprises a photodiode.

22. The optical pick-up mechanism of claim 12, wherein the actuation device comprises a voice coil motor.

23. The optical pick-up mechanism of claim 12, wherein the optical storage medium comprises an optical storage medium selected from the group consisting of a compact disc and a digital versatile disc.

24. A high-speed optical read/write device, the optical read/write device comprising:

a high-speed pick-up mechanism operable for reading data from and/or writing data to an optical storage medium, the pick-up mechanism comprising:

a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium;

a reflective element associated with the second end of the pivotable structure, wherein the reflective element is operable for transmitting light to and/or receiving light from the surface of the optical storage medium;

a light source associated with the first end of the pivotable structure, wherein the light source is operable for transmitting light to the reflective element along an optical path;

a light receiving device associated with the first end of the pivotable structure, wherein the light receiving device is operable for receiving light from the reflective element along the optical path; and an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

25. The optical read/write device of claim 24, wherein the pivotable structure comprises a pivotable arm.

26. The optical read/write device of claim 24, wherein the reflective element comprises a reflective element selected from the group consisting of a microstructure mirror, a moveable micro-electromechanical systems mirror, and a rotatable micro-electromechanical systems mirror.

27. The optical read/write device of claim 24, wherein the reflective element is attached to the second end of the pivotable structure.

28. The optical read/write device of claim 24, wherein the reflective element is integrally formed with the second end of the pivotable structure.

29. The optical read/write device of claim 24, wherein the light comprises laser light.

30. The optical read/write device of claim 24, wherein the light source comprises a laser diode.

31. The optical read/write device of claim 24, wherein the optical path comprises an optical path selected from the group consisting of a free space optical path, a fiber-guided optical path, and a waveguide-guided optical path.

32. The optical read/write device of claim 24, wherein the light receiving device comprises a photodiode.

33. The optical read/write device of claim 24, wherein the actuation device comprises a voice coil motor.

34. The optical read/write device of claim 24, wherein the optical storage medium comprises an optical storage medium selected from the group consisting of a compact disc and a digital versatile disc.

35. A high-speed optical read/write system, the optical read/write system comprising:

a high-speed optical pick-up mechanism operable for reading data from and/or writing data to an optical storage medium, the optical pick-up mechanism comprising:

a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium;

a first reflective element associated with the second end of the pivotable structure, wherein the first reflective element is operable for transmitting light to and/or receiving light from the surface of the optical storage medium;

a second reflective element associated with the first end of the pivotable structure, wherein the second reflective element is operable for transmitting light to and/or receiving light from the first reflective element along an optical path;

a light source associated with the first end of the pivotable structure, wherein the light source is operable for transmitting light to the second reflective element along the optical path;

a light receiving device associated with the first end of the pivotable structure, wherein the light receiving device is operable for receiving light from the second reflective element along the optical path; and an actuation device associated with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

36. The optical read/write system of claim 35, wherein the pivotable structure comprises a pivotable arm.

37. The optical read/write system of claim 35, wherein the first reflective element comprises a reflective element selected from the group consisting of a microstructure mirror, a moveable micro-electromechanical systems mirror, and a rotatable micro-electromechanical systems mirror.

38. The optical read/write system of claim 35, wherein the first reflective element is attached to the second end of the pivotable structure.

39. The optical read/write system of claim 35, wherein the first reflective element is integrally formed with the second end of the pivotable structure.

40. The optical read/write system of claim 35, wherein the optical path comprises an optical path selected from the group consisting of a free space optical path, a fiber-guided optical path, and a waveguide-guided optical path.

41. The optical read/write system of claim 35, wherein the light comprises laser light.

42. The optical read/write system of claim 41, wherein the light further comprises encoded laser light.

43. The optical read/write system of claim 35, wherein the light source comprises a laser diode.

44. The optical read/write system of claim 35, wherein the light receiving device comprises a photodiode.

45. The optical read/write system of claim 35, wherein the actuation device comprises a voice coil motor.

46. The optical read/write system of claim 35, wherein the optical storage medium comprises an optical storage medium selected from the group consisting of a compact disc and a digital versatile disc.

47. A high-speed method for reading data from and/or writing data to an optical storage medium, the method comprising:

providing a pivotable structure having a first end and a second end, wherein the first end of the pivotable structure is located remotely from the second end of the pivotable structure, and wherein the second end of the pivotable structure is positioned adjacent to and in a spaced-apart relationship with a surface of the optical storage medium;

disposing a reflective element in proximity to the second end of the pivotable structure, wherein the reflective element is operable for transmitting light to and/or receiving light from the surface of the optical storage medium;

disposing a light source in proximity to the first end of the pivotable structure, wherein the light source is operable for transmitting light to the reflective element along an optical path;

disposing a light receiving device in proximity to the first end of the pivotable structure, wherein the light receiving device is operable for receiving light from the reflective element along the optical path; and coupling an actuation device with the first end of the pivotable structure, wherein the actuation device is operable for pivoting the pivotable structure such that the second end of the pivotable structure is positioned adjacent to and in a spaced-apart relationship with a predetermined portion of the surface of the optical storage medium.

48. The method of claim 47, wherein the pivotable structure comprises a pivotable arm.

49. The method of claim 47, wherein the reflective element comprises a reflective element selected from the group consisting of a microstructure mirror, a moveable micro-electromechanical systems mirror, and a rotatable micro-electromechanical systems mirror.

50. The method of claim 47, wherein disposing the reflective element in proximity to the second end of the pivotable structure comprises attaching the reflective element to the second end of the pivotable structure.

51. The method of claim 47, wherein disposing the reflective element in proximity to the second end of the pivotable structure comprises integrally forming the reflective element with the second end of the pivotable structure.

52. The method of claim 47, wherein the light comprises laser light.

53. The method of claim 47, wherein the light source comprises a laser diode.

54. The method of claim 47, wherein the optical path comprises an optical path selected from the group consisting of a free space optical path, a fiber-guided optical path, and a waveguide-guided optical path.

55. The method of claim 47, wherein the light receiving device comprises a photodiode.

56. The method of claim 47, wherein the actuation device comprises a voice coil motor.

57. The method of claim 47, wherein the optical storage medium comprises an optical storage medium selected from the group consisting of a compact disc and a digital versatile disc.

* * * * *